United States Patent
Furukawa et al.

(10) Patent No.: US 6,449,238 B2
(45) Date of Patent: *Sep. 10, 2002

(54) SKEW ADJUSTMENT MECHANISM FOR AN OPTICAL PICK-UP USED IN AN OPTICAL DISC DRIVE

(75) Inventors: Ken'ichi Furukawa; Kazutomo Imi, both of Kawasaki; Kouji Teranishi, Atsugi; Satoru Manabe, Chofu, all of (JP)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,792

(22) Filed: Apr. 15, 1998

(30) Foreign Application Priority Data

Apr. 17, 1997 (JP) .............................................. 9-115156

(51) Int. Cl.⁷ .......................... G11B 17/30; G11B 21/02
(52) U.S. Cl. ...................................................... 369/219
(58) Field of Search ................................ 369/219, 215, 369/223, 244, 253, 44.32, 53.19

(56) References Cited

U.S. PATENT DOCUMENTS

| | | | | |
|---|---|---|---|---|
| 5,119,362 A | * | 6/1992 | Yanagisawa | 369/215 |
| 5,307,339 A | * | 4/1994 | Tanaka | 369/215 |
| 5,313,446 A | * | 5/1994 | Tokano et al. | 369/111 |
| 5,517,483 A | * | 5/1996 | Choi | 369/255 |
| 5,696,753 A | * | 12/1997 | Okushita | 369/219 |
| 5,764,618 A | * | 6/1998 | Kim | 369/219 |
| 5,878,017 A | * | 3/1999 | Ikegame | 369/219 |
| 5,963,535 A | * | 10/1999 | Yamakawa et al. | 369/219 |
| 5,995,478 A | * | 11/1999 | Park | 369/219 |
| 5,995,479 A | * | 11/1999 | Takizawa et al. | 369/219 |

FOREIGN PATENT DOCUMENTS

EP 0 538 824 A 4/1993
EP 0 659 130 A 4/1995

OTHER PUBLICATIONS

Patent Abstracts of Japan: Application No.: 61188744A, vol. 011, No. 015, Aug. 22, 1986.
Patent Abstracts of Japan: Application No.: 62028936A, vol. 011, No. 208, Feb. 6, 1987.
Patent Abstracts of Japan: Application No.: 62057130A, vol. 011, No. 252, Mar. 12, 1987.
Patent Abstracts of Japan: Application No.: 62082519A, vol. 011, No. 287, Apr. 16, 1987.
Patent Abstracts of Japan: Application No.: 63183628A, vol. 012, No. 460, Jul. 29, 1988.
Patent Abstracts of Japan: Application No.: 02189720A, vol. 014, No. 464, Jul. 25, 1990.

* cited by examiner

Primary Examiner—Brian E. Miller
Assistant Examiner—Tod Kupstas
(74) Attorney, Agent, or Firm—Patents & TMS, P. C.

(57) ABSTRACT

A skew adjustment mechanism for an optical pick-up used in an optical disc drive is disclosed, in which the optical pick-up is freely movable in a radial direction of an optical disc along a guide rod for playing back or recording and playing back information recorded on the optical disc. The optical pick-up includes a pick-up base having a first end and a second end opposite to the first end, the first end being slidably connected to the guide rod. The tangential skew adjustment mechanism includes a pick-up base displacement mechanism provided on the second end of the pick-up base for rotationally displacing the pick-up base about an axis of the guide rod. The pick-up base displacement mechanism includes a screw which vertically passes through the second end of the pick-up base such that a lower end portion of the screw which protrudes from the bottom surface of the pick-up base is in contact with a sliding surface which is positioned a prescribed distance below the bottom surface of the second end of the pick-up, whereby the pick-up base can be displaced by adjusting the protruding length of the lower end portion of the screw to achieve tangential skew adjustment.

10 Claims, 22 Drawing Sheets

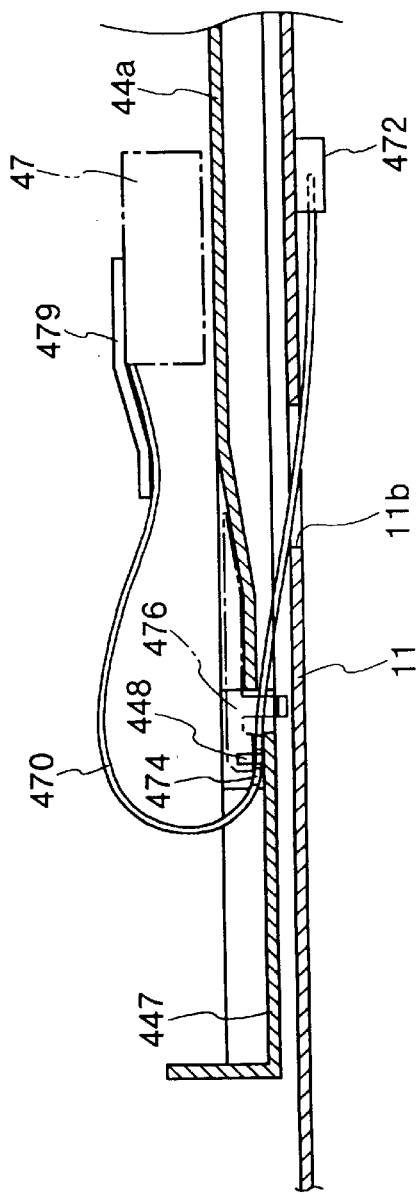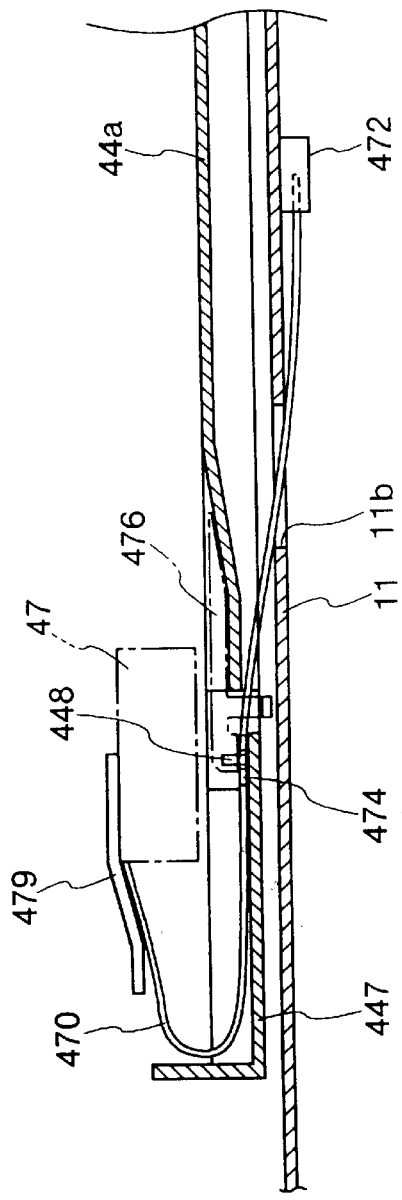
Fig. 19(a)
Fig. 19(b)

SKEW ADJUSTMENT MECHANISM FOR AN OPTICAL PICK-UP USED IN AN OPTICAL DISC DRIVE

BACKGROUND OF THE INVENTION

1. Field of the Invention

The present invention relates to a skew adjustment mechanism for an optical pick-up used in an optical disc drive, and in particular relates to a tangential skew adjustment mechanism for an optical pick-up used in an optical disc drive.

2. Description of the Prior Art

Optical disc drives are apparatuses which emit a laser beam to a signal surface (recorded surface) of a recording medium such as a compact disc (CD) or a CD-ROM, and then reproduces (playing back) the recorded information which is recorded on the signal surface through a great number of pits formed spirally on the surface based on changes in light intensity of the reflected laser beam. Examples of such optical disc drives include a CD-ROM drive and a CD-R (recordable) drive and the like.

These optical disc drives are provided with an optical pick-up which emits a laser beam to the optical disc and receives the beam reflected therefrom. FIG. 23 is an exploded view which shows the structure of one of the conventional optical disc drives.

As shown in the drawing, the optical pick-up is generally composed of a pick-up base 110 which is guided in the radial direction of the optical disc by means of two guide rods 102, 104, an actuator base 120 which is held on the pick-up base 110, a damper base 130 which is mounted to the actuator base 120, a lens holder 150 which is supported displaceably in the focusing direction (F) and the tracking direction (Tr) through suspension springs 140, and an objective lens 160 provided in the lens holder 150.

In more details, the pick-up base 110 is formed from aluminum or other metal material using a diecasting process or the like. As shown in FIG. 23, the pick-up base 110 includes a laser diode (LD) 113 which emits a laser beam, a beam splitter 114 which reflects the beam fed from the laser diode 113, a mirror 115 which reflects the beam from the beam splitter 114 toward the objective lens 160 and a photodiode 116 which receives a reflected beam reflected on the signal surface of the optical disc through the objective lens 160, the mirror 115 and the beam splitter 114 and then generates electrical signals in response to changes in light intensity of the received laser beam. Further, the pick-up base 110 includes a pair of supporting surfaces 112 for supporting the actuator base 120 rockably about the virtual center axis (A) which extends in the radial direction of the optical disc in parallel with the guide rod.

The actuator base 120 includes a base frame 121 which is formed from a substantially square plate having a substantially square opening at the roughly central portion thereof. Therefore, the base frame 121 is comprised of a front plate portion 121a and a rear plate portion 121b which are spaced with each other along the longitudinal direction of the guide rod 102, and a right plate portion 121c which is positioned at the side of the guide rod 102 and a left plate portion 121d which is positioned at the side of the guide rod 104. On the outer edges of the front plate portion 121a and the rear plate portion 121b, there are integrally formed a pair of erected wall portions 122, 122, respectively, so as to direct upwardly. Each of these erected wall portions 122, 122 has receiving surfaces which are adapted to be in abutment with the supporting surfaces 112, 122 of the pickup base 110, respectively. Further, on the outer edge of the right plate portion 121c of the base frame 121, there is integrally formed a damper base supporting portion 124 so as to direct upwardly, and the damper base 130 is mounted to this supporting portion 124. Furthermore, on the inner and outer edges of the left plate portion 121d of the base frame, there are integrally formed yokes 126, 127, respectively, so as to direct upwardly. On the inner surface of the inner yoke 126, there is provided a magnet 128.

As stated in the above, on the damper base supporting portion 124 of the actuator base 120, the damper base 130 is mounted through a screw 132. From the upper and lower portions of both sides of the damper base 130, four suspension springs 140 extend toward the lens holder 150 to support the lens holder 150 so as to be displaceable in both the tracking direction and the focusing direction.

On the lens holder 150, there are provided a focusing servo coil 152 and a tracking servo coil 154. These coils are arranged such that the yoke 126 of the actuator base 120 is positioned within the tracking servo coil 152 and the yoke 127 is positioned so as to face the focusing servo coil 154, respectively, when the damper base 130 is mounted to the supporting plate portion 124 of the actuator base 120.

In the optical pick-up having the above structure, the beam emitted from the laser diode 113 is reflected by the beam splitter 114 toward the mirror 115, and the beam reflected on the mirror 115 is focused onto the signal surface of the optical disc through the objective lens 160. The beam reflected on the signal surface of the optical disc passes the objective lens 160 and the beam is then reflected on the mirror 115 again and passes through the beam splitter 114, and then the beam is received by the photodiode 116. In this way, electrical signals responsive to changes in the light intensity of the received beam are produced in the photodiode 116, and based on thus produced electrical signals, the information recorded on the signal surface of the optical disc are reproduced.

In order to accurately read out the information recorded on the signal surface of the optical disc using the optical pick-up 100 having the above described structure, it is required that an optical axis of the beam emitted toward the optical disc through the objective lens 160 is directed vertically with respect to the signal surface of the optical disc such that the beam is properly focused on the signal surface.

However, the optical pick-up is composed of a plurality of components or parts as described above, so that there is a case that the beam is not always emitted to the signal surface of the optical disc vertically because of dimensional deviations of the respective components or parts and deviations caused upon assembling.

For this reason, the optical pick-up is provided with a skew adjustment mechanism for adjusting the direction of the beam when assembling the components and parts. In general, the skew adjustment is carried out through a radial skew adjustment and a tangential skew adjustment.

The radial skew adjustment means to adjust the beam emitting direction along the radial direction of the optical disc. In the prior art optical pick-up, such a radial skew adjustment is carried out by appropriately rotating the damper base 130 about the screw 132 in the directions indicated by the arrow (R) in the drawing.

For this purpose, in this prior art optical pick-up, a screw hole 135 is formed on the lower surface of the damper base 130 at one side thereof, and a screw 137 which passes the base frame 121 of the actuator base 120 is threaded thereinto, as shown in FIG. 24. Further, on the other side of the lower surface of the damper base 130 which is opposite to the screw hole 135, a concave portion 136 is formed and a spring 138 is disposed between the bottom of the concave portion and the actuator base 120. This spring 136 urges the damper base 130 so that the damper base can rotate about the screw 132 in the anti-clockwise direction.

When the radial skew adjustment is to be carried out, first the screw 132 is loosened so that the damper base 130 can be pivoted about the axis of the screw 132. Then, the screw 137 is adjusted from the underside of the actuator base 120 to rotate the damper base 130 to a desired position, and in this state the screw 132 is fastened to fix the damper base 130 onto the supporting plate portion 124 at that position. In this way, the lens holder 150 is also rotated with respect to the axis of the screw 132 so that the beam emitting direction from the objective lens 160 can be adjusted in the radial direction of the optical disc as shown by the arrow (R) in FIG. 23.

On the other hand, the tangential skew adjustment means to adjust the beam emitting direction along the tangential direction normal to the radial direction of the optical disc. In the prior art optical pick-up, such a tangential skew adjustment is carried out by displacing the mounting position of the actuator base 120 with respect to the pick-up base 110 in the direction shown by the arrow (Ta) in FIG. 23.

For this purpose, in this prior art optical pick-up, a screw 125 which passes the pick-up base 110 is threaded into one side of the actuator base 120 from the underside of the pick-up base 110 as illustrated in FIG. 25 in a simplified manner. Further, a spring seat member 129 is provided at the other side of the actuator base 120 opposite to the screw 125 with respect to the supporting surface 112 of the pick-up base 110. The spring seat member 129 is a rod-shaped member, and it passes through the pick-up base 110 and is anchored with the other side of the actuator base 120. At the lower end portion of the spring seat member 129, there is formed a spring seat. A spring 129a is disposed between the bottom surface of the pick-up base 110 and the spring seat to urge the actuator base 120 by the biasing force of the spring so that the actuator base 120 rotates in the anti-clockwise direction in the drawing.

In this prior art optical pick-up, the tangential skew adjustment is carried out by adjusting the screw 125 appropriately from the underside of the pick-up base 110 to rotate the actuator base 120 about the virtual axis A described above, thereby adjusting the beam emitting direction in the tangential direction.

As described above, in the prior art optical pick-up, both the radial skew adjustment and the tangential skew adjustment are carried out by adjusting the screws 132, 125 from the underside of the actuator base 120 and the pick-up base 110. Therefore, in this prior art optical pick-up, it is not possible to make such skew adjustments after the optical pick-up has been assembled with the optical disc drive.

However, even if such skew adjustments have been carried out before the optical pick-up 100 is assembled with the optical disc drive, there still remain a case that the optical axis of the beam is not directed to the signal surface of the optical disc vertically after the optical pick-up is assembled with the optical disc drive because of mounting state of the guide rod or preciseness of the resin molding parts or the like. If such a case would occur, a jitter characteristic of the optical pick-up 100 is lowered.

Therefore, it is desired that skew adjustments can be carried out even after the optical pick-up is assembled with the optical disc drive. In particular, in the case of CD-R drive in which data is writable to an optical disc, a deviation of the optical axis of the laser beam affects a writing performance even though it is very small, and therefore more precise skew adjustment is required. Therefore, it is desirable that skew adjustments could be also carried out even after the optical pick-up has been assembled with the optical disc drive.

SUMMARY OF THE INVENTION

The present invention has been made in view of the problem involved in the prior art optical pick-up. Accordingly, it is an object of the present invention is to provide a skew adjustment mechanism for an optical pick-up used in an optical disc drive in which a tangential skew adjustment can be carried out easily even after the optical pick-up is assembled with the optical disc drive.

In order to achieve the object, the present invention is directed to a skew adjustment mechanism for an optical pick-up used in an optical disc drive, the optical pick-up being provided in the disc drive freely movable in a radial direction of an optical disc along a guide rod for playing back or recording and playing back the optical disc, wherein the skew adjustment mechanism comprises a tangential skew adjustment mechanism for adjusting tangential skew of the optical pick-up after the optical pick-up has been assembled into the disc drive.

In this skew adjustment mechanism, the optical pick-up includes a pick-up base having a first end and a second end opposite to the first end, the first end being slidably connected to the guide rod, and the tangential skew adjustment mechanism includes a displacement means provided on the second end of the pick-up base for rotationally displacing the pick-up base about an axis of the guide rod.

The displacement means is preferably composed of a screw which vertically passes through the second end of the pick-up base such that a lower end portion of the screw protrudes from the bottom surface of the pick-up base and a sliding surface positioned a prescribed distance below the bottom surface of the second end of the pick-up base so that the lower end portion of the screw is in contact with the sliding surface, whereby the pick-up base can be displaced by adjusting the protruding length of the lower end portion of the screw.

According to the tangential skew adjustment mechanism having the structure described above, it is still possible to adjust tangential skew even after the optical pick-up 30 has been assembled into the optical disc drive, since the optical pick-up can be rotationally displaced with respect to an axis of the guide rod by appropriately adjusting the screw from the upper side of the optical pick-up.

The tangential skew adjustment mechanism may further include a biasing means for biasing the pick-up base in a direction which causes the lower end portion of the screw to abut the sliding surface.

In this case, it is preferred that the biasing means is constructed from a plate spring provided on the second end of the pick-up base and a downward facing abutment surface provided a prescribed distance above the sliding surface, in which the plate spring is adapted to slidably abut onto the downward facing abutment surface to produce a biasing force for rotating the pick-up base downwardly about the axis of the guide rod.

Another aspect of the present invention is directed to a skew adjustment mechanism for an optical pick-up used in an optical disc drive, the optical pick-up being provided in the disc drive freely movable in a radial direction of an optical disc along a guide rod for playing back or recording and playing back the optical disc, and the optical pick-up including a pick-up base having a first end which is slidably connected to the guide rod and a second end opposite to the first end, wherein the skew adjustment mechanism comprises a tangential skew adjustment mechanism for carrying out tangential skew adjustment by rotationally displacing the pick-up base with respect to an axis of the guide rod.

In this arrangement, it is preferred that the second end of the pick-up base includes a bottom surface, in which the tangential skew adjusting means includes a screw which vertically passes through the second end of the pick-up base such that a lower end portion of the screw protrudes from the bottom surface of the pick-up base and a sliding surface positioned a prescribed distance below the bottom surface of the second end of the pick-up base so that the lower end portion of the screw is in contact with the sliding surface, whereby the pick-up base can be displaced by adjusting the protruding length of the lower end portion of the screw.

The other aspect of the present invention is directed to a skew adjustment mechanism for an optical pick-up used in an optical disc drive, in which the optical pick-up comprises a pick-up base movable in a radial direction of an optical disc along a guide rod provided on a chassis of the disc drive, an actuator base held on the pick-up base so as to be pivotal with respect to a virtual axis that is parallel to the guide rod, and a lens holder which is supported by the actuator base so as to be displaceable at least in tracking direction and focusing direction and which has an objective lens, wherein the skew adjustment mechanism comprising a first tangential skew adjustment mechanism for rotationally displacing the actuator base relative to the pick-up base about the virtual axis; and a second tangential skew adjustment mechanism for rotationally displacing the pick-up base about an axis of the guide rod.

According to the skew adjustment mechanism having the above described structure, not only it is still possible to adjust tangential skew even after the optical pick-up 30 has been assembled into the optical disc drive, but also it becomes possible to carry out a more precise tangential skew adjustment, since different two types of tangential skew adjustments can be made by the provision of the first and second tangential skew adjustments.

Other objects, structures and advantages of the present invention will be apparent when the following description of the preferred embodiments is considered taken in conjunction with the accompanying drawings.

BRIEF DESCRIPTION OF THE DRAWINGS

FIGS. 19(*a*) and 19(*b*) are explanatory drawings which show changed forms of the flexible printed circuit according to the movement of the optical pick-up;

DETAILED DESCRIPTION OF THE PREFERRED EMBODIMENTS

A detailed description of the preferred embodiments of a skew adjustment mechanism for an optical pick-up used in an optical disc drive according to the present invention will now be given below with reference to the appended drawings.

Figure 1:
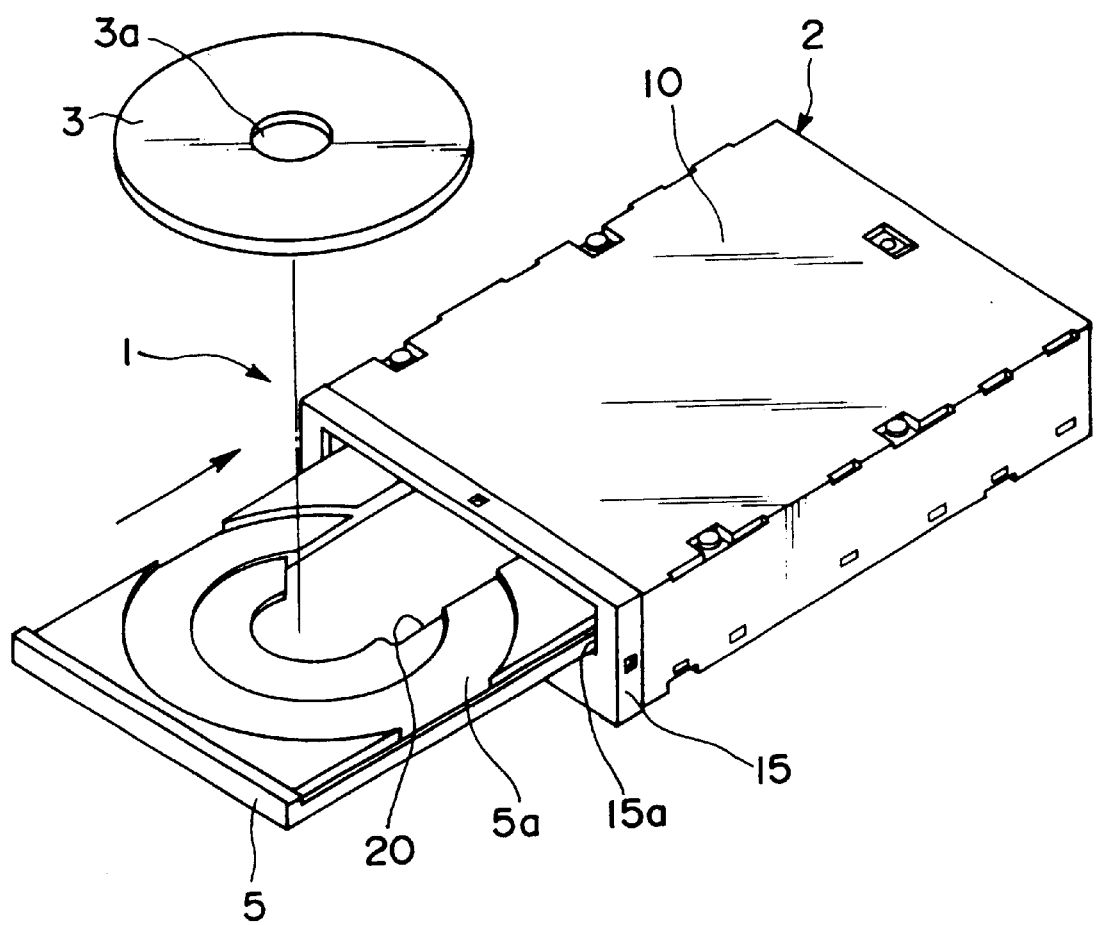
FIG. 1 is a perspective view which shows an external appearance of an optical disc drive to which a skew adjustment mechanism of the present application is applied.
Figure 2:
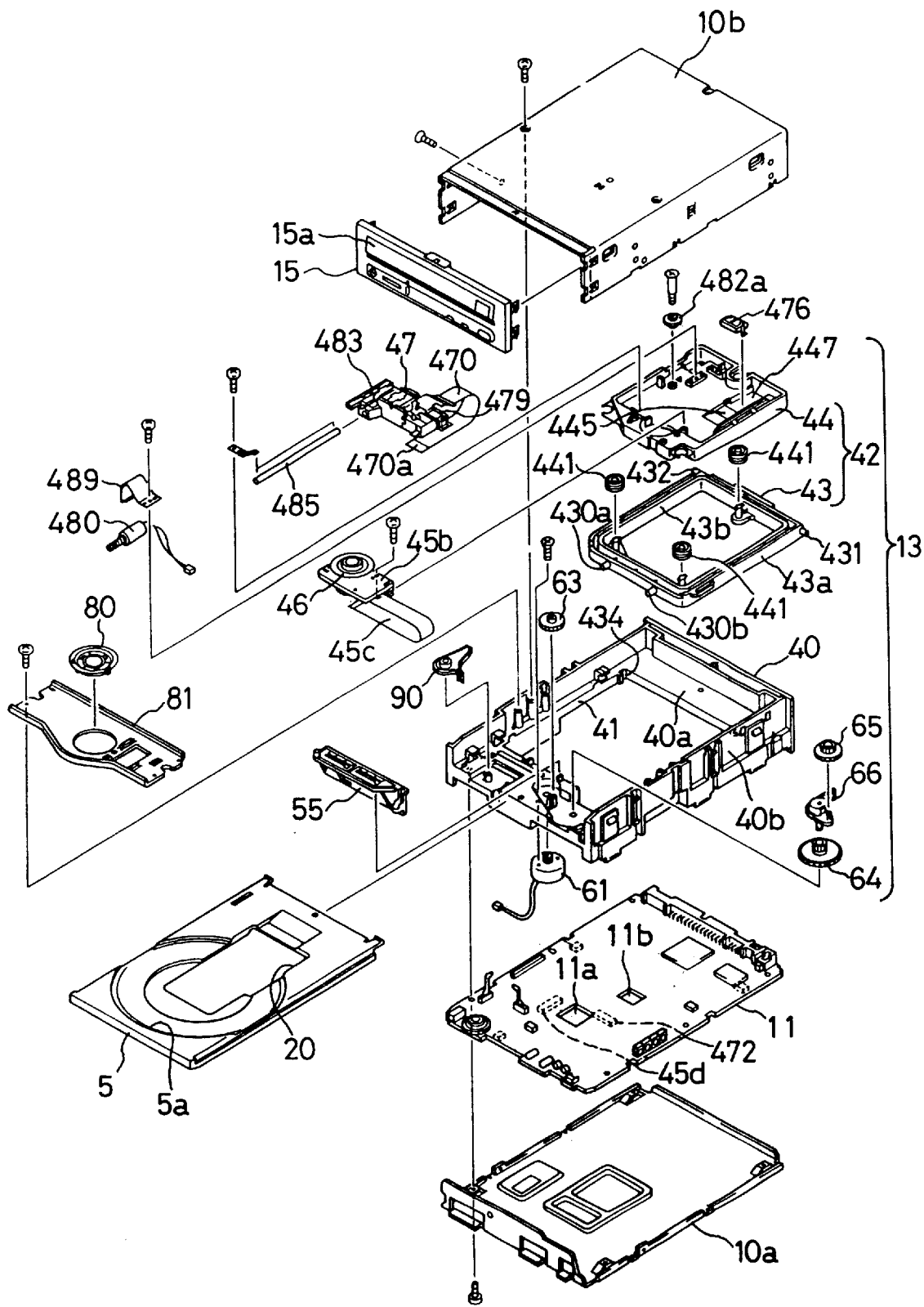
FIG. 2 is an exploded view of the optical disc drive shown in FIG. 1.
Figure 3:
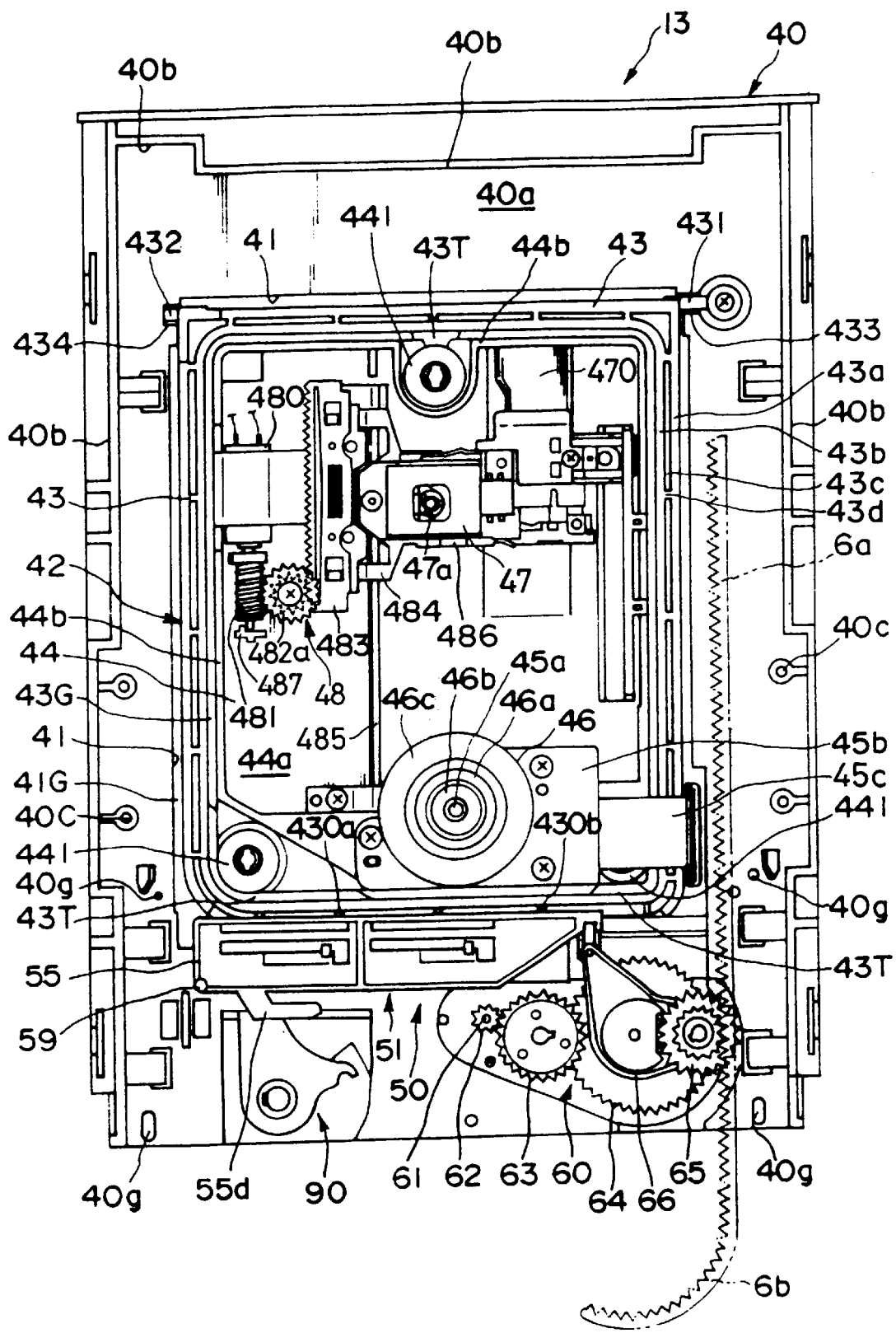
FIG. 3 is a planar view of a main body of the optical disc drive from which a casing is removed, in which a mechanism unit is shown in a lowered position.
Figure 4:
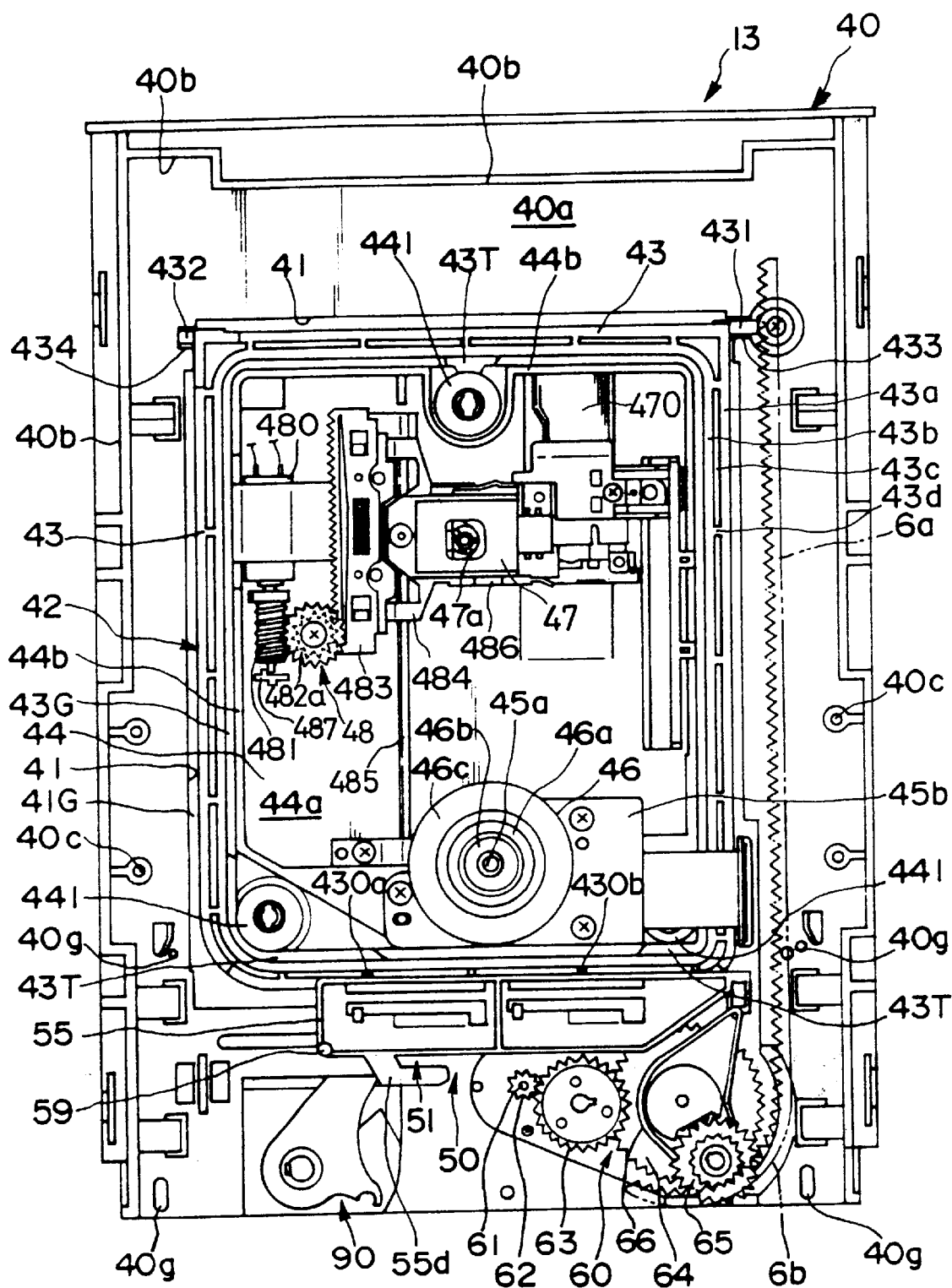
FIG. 4 is another planar view of the main body of the optical disc drive from which a casing is removed, in which the mechanism unit is shown in a raised position.

FIG. 1 is a perspective view which shows an external appearance of an optical disc drive to which a skew adjustment mechanism for an optical pick-up used in an optical disc drive according to the present invention is applied, FIG. 2 is an exploded perspective view of the optical disc drive, FIG. 3 is a planar view of a main body 2 of the optical disc drive from which a casing is removed, which shows a state in which a mechanism unit is in a lowered position (lower position), and FIG. 4 is another planar view of the main body 2, which shows a state in which the mechanism unit 42 is in a raised position (upper position).

The disc drive 1 shown in FIG. 1 is configured into a CD-R drive for playing back or recording and playing back an optical disc (CD-R) 3. The disc drive 1 is roughly constructed from a main body 2 and a disc tray 5 which is movable in the forward and backward direction (horizontal direction) with respect to the main body 2 for transporting the optical disc 3.

As shown in FIG. 2, the main body 2 is roughly constructed from a printed circuit board 11, a mechanism assembly 13 provided on the printed circuit board 11 and a casing 10 which houses the printed circuit board 11 and the mechanism assembly 13. The casing 10 is comprised of a bottom plate 10a provided below the printed circuit board 11 and a roughly box-shaped upper case 10b whose front and bottom sides are opened so as to surround the mechanism assembly 13. The bottom plate 10a and the upper case 10b are formed from thin metal plates, and they are attached to the mechanism assembly 13 by means of screws or the like. Further, at the front portion of the casing 10, there is mounted a front panel 15 having an opening 15a.

As shown in FIG. 2, the printed circuit board 11 is provided with an interface connector for connection with a personal computer, various IC such as a microprocessor, memories and motor drivers and the like, and various electrical parts such as resistors, capacitors and switches and the like. With these elements, not only the optical pick-up but also a spindle motor, a loading motor and a sled motor described herein below are electronically controlled.

As shown in FIGS. 2 to 4, the mechanism assembly 13 housed in the casing 10 is provided with a chassis 40 which is preferably constructed from a hard resin. The chassis 40 is constructed from a bottom portion 40a having a roughly rectangular-shaped aperture 41 and a U-shaped wall portion 40b which stands erect along the left, right and back edge portions of the bottom portion 40a.

In this way, no wall portion is formed in the front of the chassis 40 such that the front of the chassis 40 is open. Further, when the mechanism assembly 13 is assembled into the casing 10, the open front portion of the chassis 40 is aligned with the opening 15a of the front panel 15 attached to the casing 10 so that the disc tray 5 can be moved into and out of the main body 2 through the opening 15a.

As shown in FIGS. 1 and 2, the disc -tray 5 is provided with a shallow concave disc supporting portion 5a. The optical disc 3 is placed in the disc supporting portion 5a of the dick tray 5, and then transported to a disc loaded position (disc playback position) with the optical disc 3 being placed in a prescribed position. Further, in the disc tray 5, there is formed a substantially rectangular shape opening 20 which extends from the roughly central portion of the disc supporting portion 5a toward the rear portion thereof such that a turntable described hereinbelow can be raised through this opening 20 and an optical scanning can be carried out by the optical pick-up 30 through this opening 20.

Figure 5:
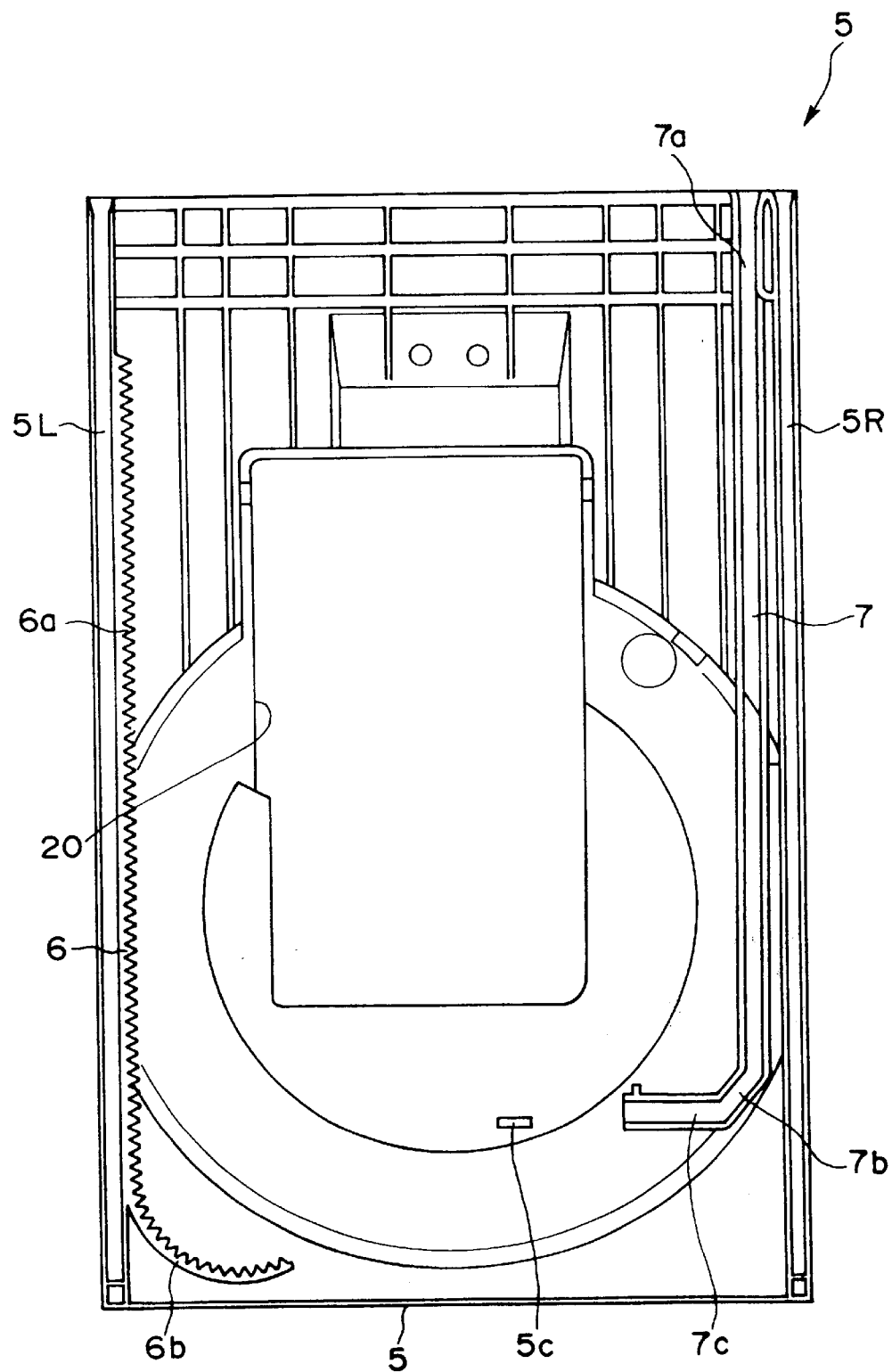
FIG. 5 is a bottom view of the construction of the underside of a disc tray of the optical disc drive shown in FIG. 1.

As shown in FIG. 5, on the left and right portions of the underside surface of the disc tray 5, there are formed guide grooves 5L, 5R so as to extend in a longitudinal direction of the disc tray 5. These guide grooves 5L and 5R are adapted to slidably engage with protruding guide members 40g (see FIG. 3 and FIG. 4) formed on the left and right side portions of the bottom portion 40a of the chassis 40.

Further, the underside surface of the disc tray 5 is provided with a rack gear 6 which includes a first rack 6a which extends in a straight line in the forward and backward direction along the guide groove 5L and a roughly 90 degree arc-shaped second rack 6b which is formed at the front end portion (front side of the disc tray 5, as shown in the lower portion of FIG. 5) of the first rack 6a so as to be continuous therewith.

Furthermore, as shown in FIG. 5, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

In this regard, it is to be noted that a rib (protrusion) indicated by the reference numeral 5c in the drawing is a member that is adapted to engage with a disc tray locking portion 55d formed in the cam member 55 (described below) for restricting the horizontal movement (forward and backward direction) of the disc tray 5.

Further, as shown in FIG. 2 to FIG. 4, the chassis 40 is provided with a mechanism unit 42 equipped with a turntable 46 for rotating the optical disc 3 and an optical pick-up 30 for playing back or recording and playing back the optical disc 3 and others.

The mechanism unit 42 is arranged inside a roughly rectangular-shaped opening 41 formed in the bottom portion 40a of the chassis 40, and the rear portion of the mechanism unit 42 is pivotally supported with respect to the chassis 40. With this result, it is possible that the front portion of the mechanism unit 42 is displaced between a raised position (upper position; FIG. 4) in which the optical disc 3 is supported on the turntable 46 and a lowered position (lower position; FIG. 3) which is lower than the raised position.

In particular, as shown in FIG. 2 to FIG. 4, the mechanism unit 42 includes a base frame 43 constructed preferably from a hard resin, and a support member (support plate) 44 which is supported on the base frame 43 via elastic members (insulators) 441.

The base frame 43 is formed so as to have a roughly rectangular shape which includes a front portion and a rear portion. In more detail, the base frame 43 comprises a substantially rectangular outer frame 43a and a substantially rectangular inner frame 43b arranged inside the outer frame 43a. The inner frame 43b is one size smaller than the outer frame 43a so as to define a space therearound and its corner portions are formed into an arched shape, respectively. Further, between the outer and inner frames 43a, 43b there is formed a horizontal connecting portion 43c which connects these frames integrally at a position roughly the middle of their height. Furthermore, a plurality of reinforcing vertical ribs 43d are integrally formed on the connecting portion 43c through a predetermined spacing so as to connect the outer and inner frames integrally. With this result, the base frame 43 is constructed into a so called rudder frame in which the reinforcing vertical ribs 43d are formed on the horizontal connecting portion 43c through a prescribed spacing around the inner frame 43b.

This base frame 43 is formed by injection molding. In this case, if the base frame 43 is formed from a usual mold body made of a hard resin and having a certain thickness, there is a case that deformation would occur when it is cooled after injection molding. However, if the base frame 43 is formed in the form of the rudder frame described above, it is possible to avoid such deformation from occurring and this means that it becomes possible to provide a light base frame having a high strength by injection molding.

Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner wall portions of the chassis 40 defining the opening 41. By supporting the rear portion of the mechanism unit 42 with the axles 431, 432 in this way, the front portion of the mechanism unit 42 is able to move with respect to the chassis 40 between the lowered position shown in FIG. 3 and the raised position shown, in FIG. 4 when the mechanism unit 42 (base frame 43) is rotated around the axles 431, 432.

Figure 20:
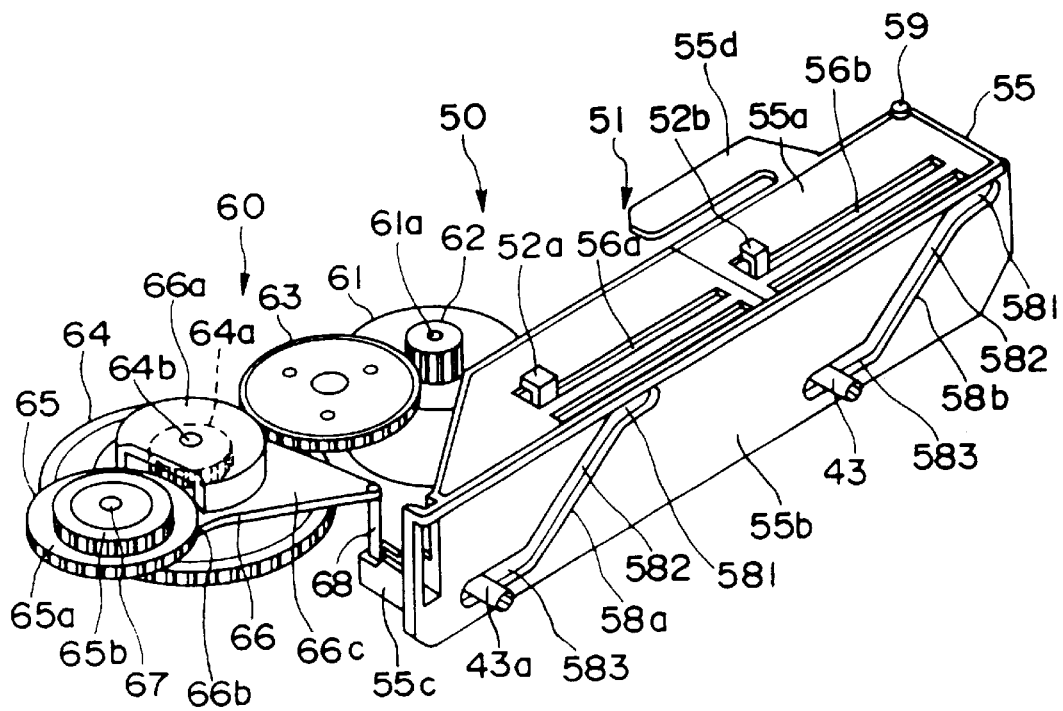
FIG. 20 is a perspective view which shows the structure of a cam mechanism used in the optical disc drive shown in FIG. 1, in which the cam member is shown in a first position.
Figure 21:
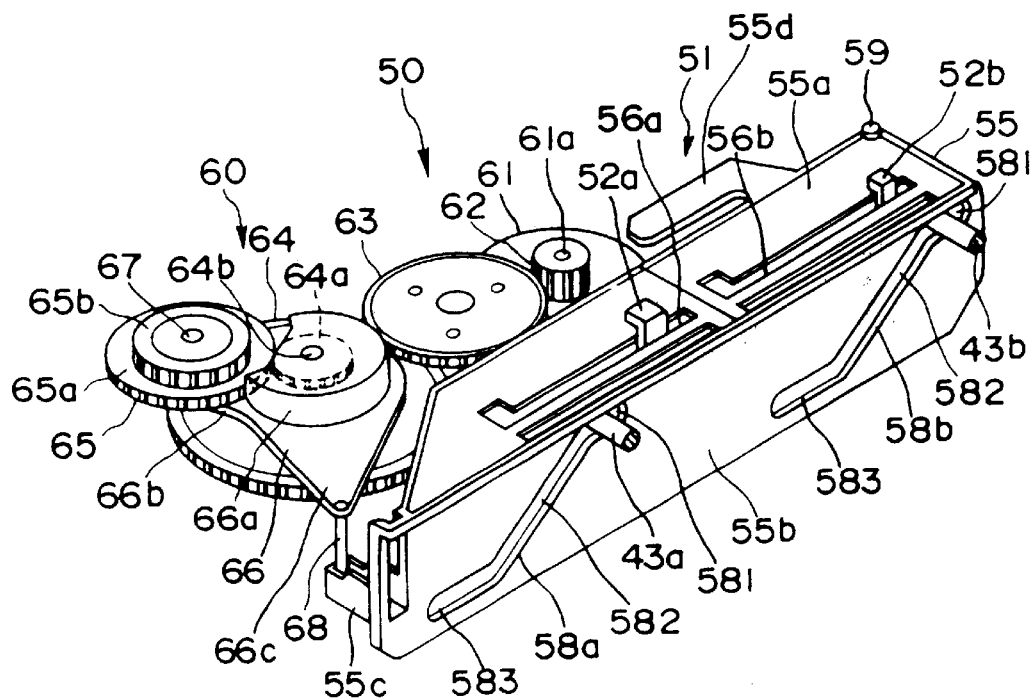
FIG. 21 is a perspective view which shows the structure of the cam mechanism used in the optical disc drive shown in FIG. 1, in which the cam member is shown in a second position.

Further, a pair of protruding guide pins 430a, 430b are formed on the front of the base frame 43 (See FIG. 20 and FIG. 21). These guide pins 430a, 430b pass through respectively a pair of guide slots (not shown in the drawings) formed in the wall portion of the front portion of the chassis 40 which defines the opening 41, and then engage respectively with cam grooves 58a, 58b of the cam member 55 of the cam mechanism 51 described hereinbelow. This enables the front portion of the base frame 43 to be guided up or down in accordance with the displacement of the cam member 55.

Taking possible deformation (thermal deformation or the like) of the chassis 40 into account, a prescribed peripheral spacing 41G is provided between the base frame 43 and wall portions of the chassis 40. Specifically, this spacing 41G is provided around roughly the entire circumference of the base frame 43. In this way, the pivotal movement of the base frame 43 is not hindered even when the chassis 40 undergoes maximum distortion.

The support member 44 is constructed from a roughly rectangular-shaped bottom portion 44a and a wall portion 44b formed around the circumference of the bottom portion 44a. The wall portion 44b is one size smaller than the inner frame 43b of the base frame 43 such that the wall portion 44b is arranged inside the inner frame 43b of the base frame 43 via a prescribed spacing 43G. The support member 44 is supported by the base frame 43 via the elastic members (insulators) 441 provided on tabs 43T formed at the left and right corner portions of the front side of the inner frame 43b of the base frame 43 and on a tab 43T formed at roughly the middle of the rear portion of the inner frame 43b of the base frame 43. Namely, the support member 44 is supported by the base frame 43 via the elastic members 441 provided at three points which roughly form an isosceles triangle.

Figure 6:
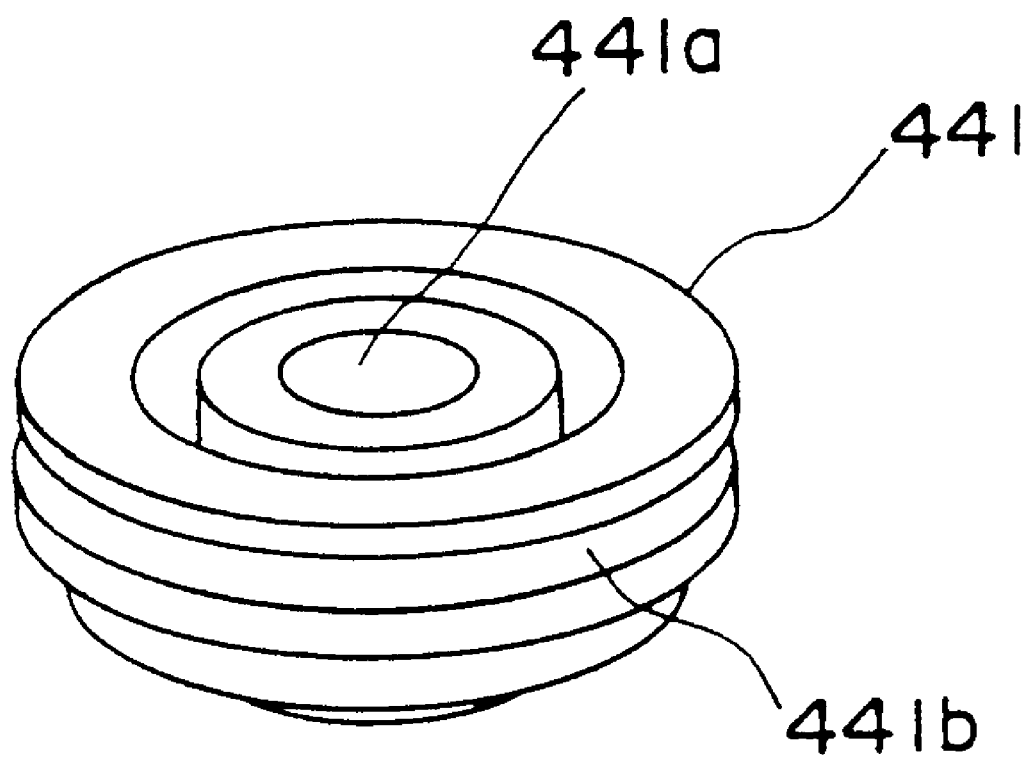
FIG. 6 is a perspective view showing the structure of an elastic member used in the optical disc drive shown in FIG. 1.

As shown in FIG. 6, each of the elastic members 441, which is formed from an elastic material such as rubber or the like, has a roughly cylindrical shape including a center hole 441a axially formed. On the outer circumferantial surface, there is formed a circumferantial groove 441b. When the elastic members 441 are arranged in place to support the support member 44 on the base frame 43, the center hole 441a of each elastic member 441 fits onto an axis provided on the respective tabs 43T of the base frame 43 and then the groove 441b fits over a respective notched portion formed at the corresponding position of the support member 44. This construction serves to prevent vibration that is generated by rotation of the spindle motor (that is an optical disc) described hereinbelow from being transmitted to the chassis 40. Further, this structure also serves to prevent vibration given from the outside of the optical disc drive from being transmitted to the support member 44.

Further, as shown in FIG. 2 to FIG. 4, the support member 44 is provided with a spindle motor (not shown in the drawings) for rotating an optical disc 3, a turntable 46 fixed to the rotation shaft 45a of the spindle motor, an optical pick-up 30, and an optical pick-up moving mechanism 48 for moving the optical pick-up 30 in the radial direction of the optical disc 3. The optical pick-up moving mechanism 48 is constructed in the form of a sliding feed mechanism.

The spindle motor is mounted to a motor support 45b which is made of a metal plate fixed to the support member 44. The spindle motor is capable of rotating the optical disc 3 at a high rotational speed, for example, capable of rotating the optical disc 3 at a speed of 180–3000 rpm. Further, a flat cable 45c is connected to the spindle motor for inputting and outputting control signals for the motor. As clearly shown in FIG. 2, this flat cable 45c extends through an opening 11a formed in the printed circuit board 11 and then the tip of the cable is connected to a prescribed connector 45d provided on the underside of the printed circuit board 11.

The turntable 46 is a disc-shaped member which includes a protruding ring-shaped center hub 46a formed in the center portion of the turntable 46. This center hub 46a is adapted to fit into a center hole 3a of the optical disc 3. The center hub 46a is formed so as to taper from the tip to the base in order to prevent the optical disc 3 from slipping off center when placed on the turntable 46. Further, inside the center hub 46a, there is provided a spring (not shown in the drawings) which allows the center hub 46a to be moved up and down. Furthermore, a ring-shaped permanent magnet 46b for creating an attraction force on a disc damper (described below) is provided in the turntable 46 at a position between the center hub 46a and the rotation shaft 45 of the spindle motor.

Further, a ring-shaped pad 46c is bonded to the upper part of the turntable 46 (i.e., the side used to support the optical disc 3) around the circumference of the center hub 46a. The pad 46c is made from an elastic material having a relatively high coefficient of friction so as to exhibit a function that prevents the optical disc 3 from slipping. Examples of such a material include various rubbers, soft resins or porous materials (sponges) or the like.

As described above, on the support member 44, there is provided the optical pick-up moving mechanism 48 constructed in the form of a sliding feed mechanism. This optical pick-up moving mechanism 48 is provided for moving the optical pick-up 30 in the radial directions of the optical disc 3.

Figure 7:
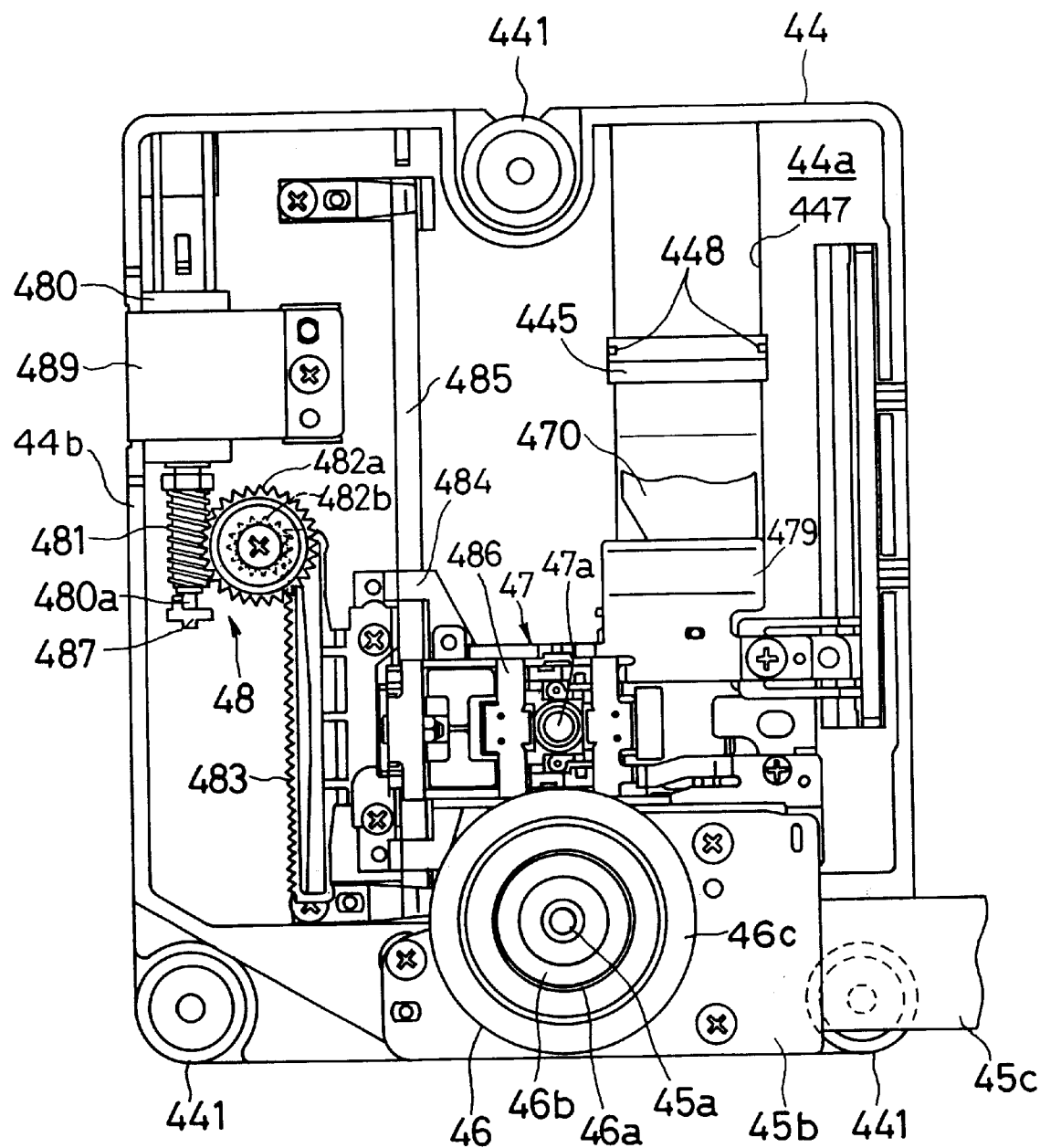
FIG. 7 is a planar view which shows a structure of a support member (optical pick-up moving mechanism 48) of the optical disc drive shown in FIG. 1.

As illustrated in FIG. 7 in detail, the optical pick-up moving mechanism 48 is roughly constructed from a DC motor (sled motor) 480 capable of forward and reverse rotation, a worm (lead screw) 481 which is mounted to the rotational shaft 480a of the motor 480 and which is formed with a left-hand thread, a worm wheel 482a which meshes with the lead screw 481, a small-diameter pinion gear 482*b* which is co-axially formed with the underside surface of the worm wheel 482*a*, and a rack gear 483 which meshes with the pinion gear 482*b*. The optical pick-up 30 which is slidably guided by a guide rod 485 is coupled to the rack gear 483.

Each of the lead screw 481, the worm wheel 482*a*, the pinion gear 482*b* and the rack gear 483 are formed from a plastic material. In particular, the rack gear 483 is formed from an elastic plastic material. Namely, as shown in FIG. 7, the rack gear 483 is formed into a structure in which the opposite ends thereof are supported by a substantially C-shaped arm so as to allow deformation toward the guide rod 485. Further, the lead screw 481 and the guide rod 485 are arranged so that their lengthwise directions are directed roughly parallel to the forward and backward direction of the optical disc drive 1.

A combination of the lead screw 481, the worm wheel 482*a*, the pinion gear 482*b* and the rack gear 483 constitutes a rotational speed reducing mechanism of the optical pick-up moving mechanism 48 (sliding feed mechanism), so that the rotational motion of the sled motor 480 is transformed into a linear motion of the optical pick-up 30 with reducing the speed. In this way, by rotating the sled motor 480 in either of forward or reverse direction, it is possible to move the optical pick-up 30 in the radial direction of the optical disc 3 along the guide rode 485.

Specifically, when the rotational shaft 480*a* of the sled motor 480 is rotated in the clockwise direction viewed from the tip side of the rotational shaft, the worm wheel 482*a* is also rotated in the clockwise direction viewed from the upper side of the rotational axis thereof through the lead screw 481 having the left-hand thread, so that the rack gear 483 is fed forward (toward the turntable). As a result, the optical pick-up 30 is moved toward the inner side of the optical disc 3 from the outer side thereof. On the other hand, when the sled motor 480 is rotated in a reverse direction, the optical pick-up 30 is moved toward the outer side from the inner side. In this connection, it is to be noted that the lead screw 481 and worm wheel 482*a* may be formed with a right-hand thread, respectively, and in this case the motion of the pick-up 30 described above is also reversed.

Meanwhile, the rotational shaft 480*a* of the sled motor 480 is provided with a small play in its axial direction in order to enable smooth rotation, so that the rotational shaft 480*a* can be slightly displaced within the play in the axial direction thereof. Therefore, when the rotational shaft 480*a* of the sled motor 480 is rotated in the anti-clockwise direction (which moves the optical pick-up 30 toward the outer side of the optical disc) viewed from the tip side of the rotational shaft, the rotational shaft 480*a* of the motor 480 is pulled and slightly displaced toward the tip end thereof within the play due to the rotation of the lead screw 481.

In this embodiment, in order to minimize the axial displacement of the rotational shaft 480*a* of the motor 480 within the play which is caused by the rotation of the lead screw 481, there is provided a means 487 for restricting displacement of the rotational shaft (rotational shaft displacement restricting means). This rotational shaft displacement restricting means 487 is provided in front of the tip of the rotational shaft 480*a* so that the tip of the rotational shaft 480*a* is abutted thereto to restrict further axial displacement of the rotational shaft 480*a* when the rotational shaft 480*a* is axially displaced toward the tip side thereof.

Figure 8:
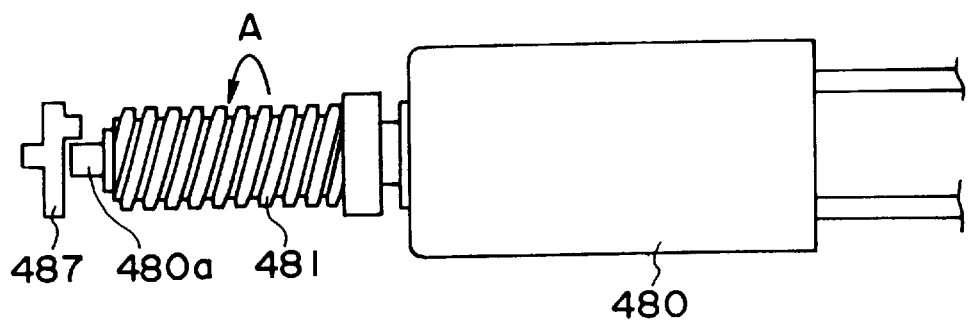
FIG. 8(*a*) is a planar view which shows a sled motor used in a sliding feed mechanism of the optical pick-up moving mechanism, and FIG. 8(*b*) is an enlarged view which shows the gap between the tip of the rotation axis of the sled motor and a stopper member.
Figure 8:
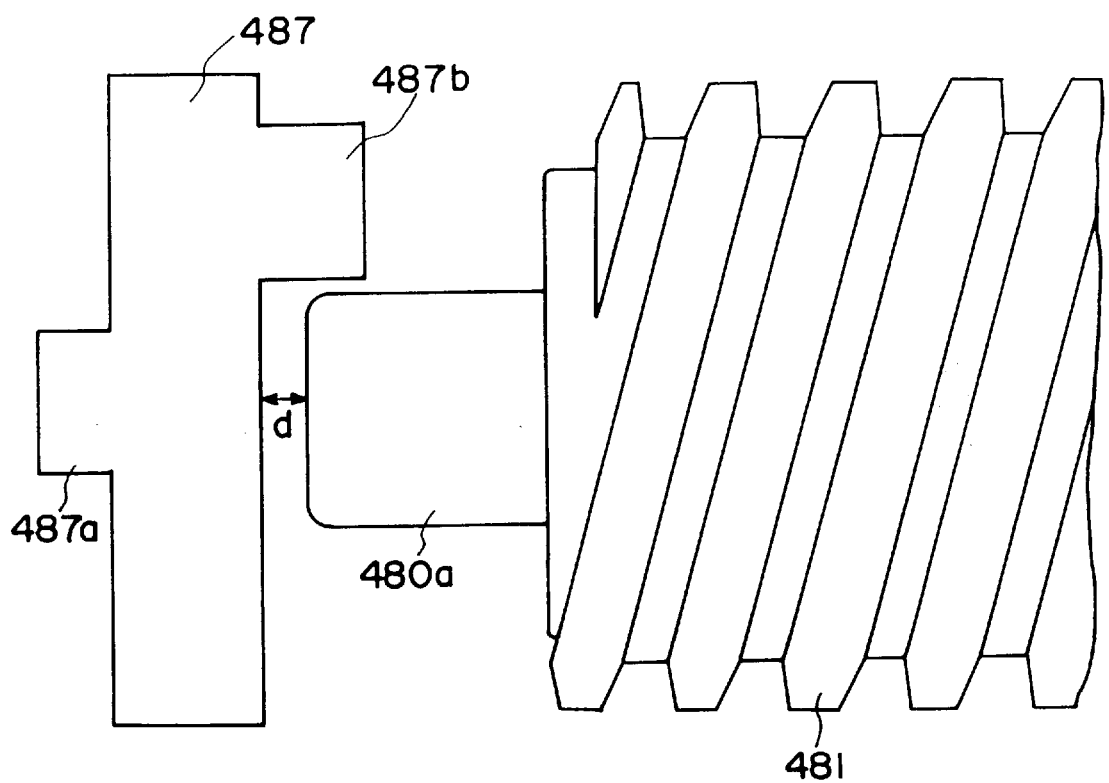

As clearly shown in FIG. 8(*a*) and FIG. 8(*b*), the rotational shaft displacement restricting means 487 is constructed from a stopper member 487 which is positioned through a prescribed distance "d" from the tip of the rotational shaft 480*a* under the state that the rotational shaft 480*a* is sifted to the base side thereof within the play. This stopper member 487 is integrally formed with the bottom portion 44*a* of the support member 44 so as to protrude therefrom at a position where the tip of the rotational shaft 480*a* becomes abutted thereto when the rotational shaft 480*a* is displaced toward tip end due to the rotation of the lead screw 481.

For this purpose, the prescribed distance "d" is determined to be a size less than the play of the rotational shaft 480*a*. For example, in the case of a small-size motor such as one used in the optical pick-up moving mechanism of the CD-R drive, the prescribed distance "d" is set to lie within the range of from 0.02 mm to 0.05 mm.

Since the stopper member 487 is pushed when the tip of the rotational shaft 480*a* is abutted thereto, it is preferred that a reinforcing means is further provided to increase its strength. For example, as shown in FIG. 8(*b*) it is possible to form a reinforcing rib 487*a* on the rear surface (a surface which does not face the rotational shaft) of the stopper member 487 integrally. Further, it is also possible to form another reinforcing rib 487*b* on the front surface as shown in FIG. 8(*b*). This reinforcing rib 487*b* is provided at a position of the front surface where the rotational shaft 480*a* of the sled motor 480 is not abutted.

Figure 9:
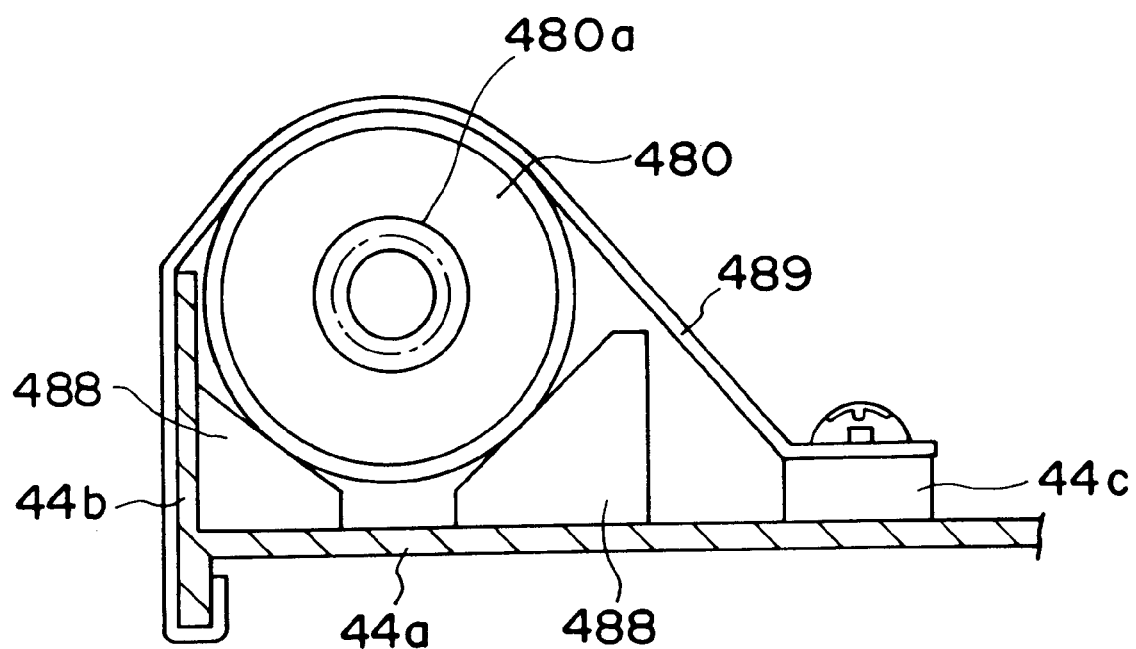
FIG. 9 is a front view which shows the mounting state of the sled motor.

As shown in FIG. 9, the sled motor 480 is placed on a pair of supporting members 488 which are integrally formed with the bottom portion 44*a* of the support member 44. Each of the supporting members is constructed from two pieces arranged so as to form a V-shaped supporting surface. Further, the sled motor 480 is mounted onto the supporting members 488 by holding the upper portion of the motor 480 with a retaining plate 489 which is formed from a metal plate or the like. Specifically, one end of the retaining plate 489 is bent along the side wall 44*b*, and its tip portion is formed into a C-shaped hook which is engaged with the lower edge of the side wall 44*b*. On the other hand, the other end of the retaining plate 489 is mounted onto a mounting portion 44*c* formed on the bottom portion 44*a* by means of a screw or the like.

When the sled motor 480 is to be mounted onto the supporting members 488, first the sled motor 480 is positioned onto the supporting members under the condition that a thin metal plate or the like having a prescribed thickness is interposed between the tip of the rotational shaft 480*a* of the sled motor 480 and the stopper member 487. As described above, the thickness of the metal plate is less than the play, for example 0.02 mm to 0.05 mm. Next, the sled motor 480 is secured onto the supporting members 488 using the retaining plate 489 described above, and then the metal plate which has been interposed between the tip of the rotational shaft 480*a* and the stopper member 487 is removed therefrom. In this way, it is possible to precisely set the distance between the tip of the rotational shaft 480*a* and the stopper member 487 so as to be the prescribed distance "d".

Figure 10:
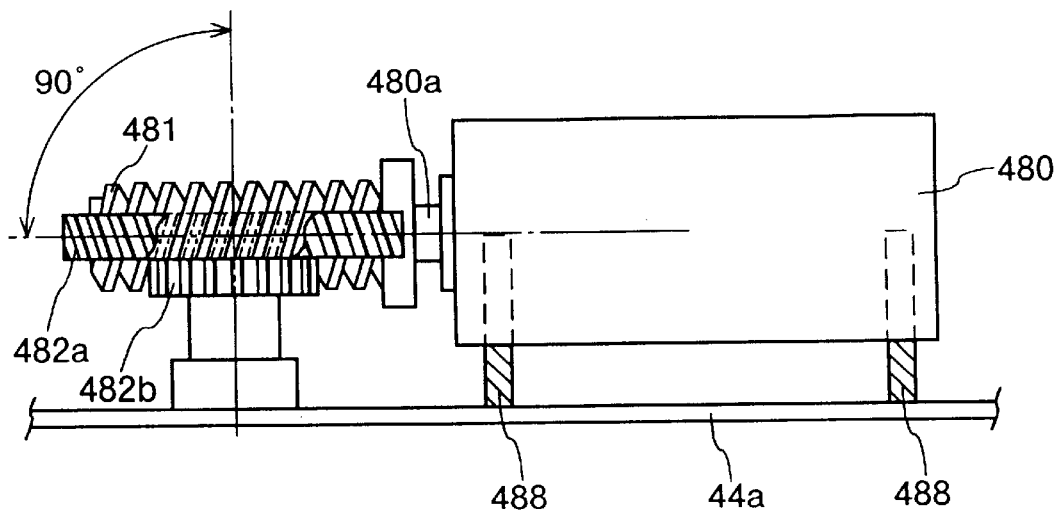
FIGS. 10(*a*), 10(*b*) and 10(*c*) show engagement conditions between a lead screw and a warm wheel used in the sliding feed mechanism, respectively.
Figure 10:
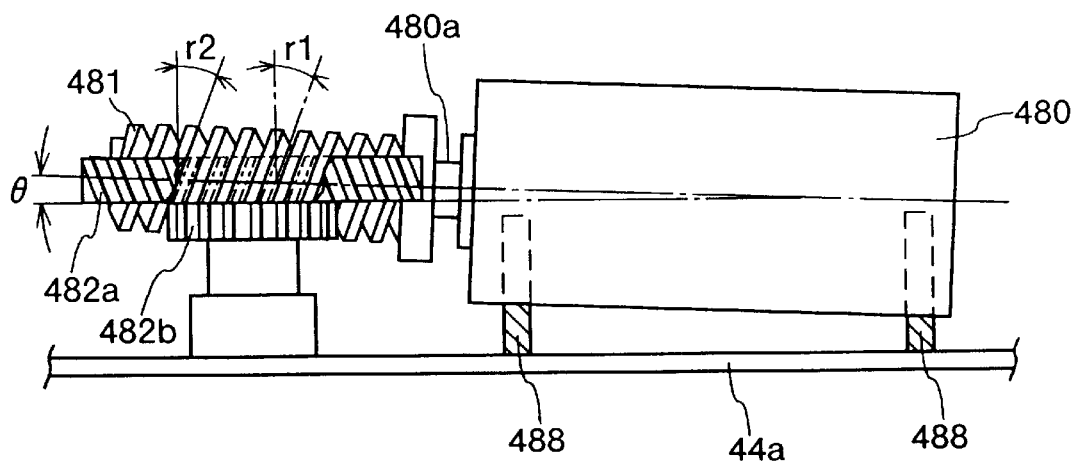
Figure 10:
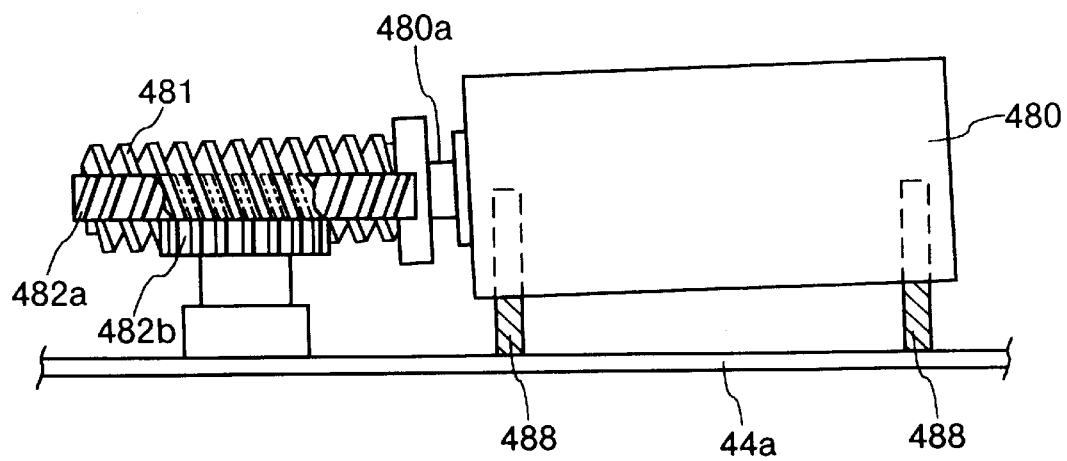

Further, in general, the lead screw 481 of the sled motor 480 and the worm wheel 482*a* are arranged in such a manner that their rotational axes are perpendicular to each other as shown in FIG. 10(*a*). Moreover, in order to move the optical pick-up 30 properly in the radial direction of the optical disc 3 with a high accuracy, each of the lead screw 481 and the worm wheel 482*a* is formed so as to have teeth with a small module and a small lead angle. However, in a case where such lead screw 481 and worm wheel 482a are used, there is a case that the lead screw 481 is locked up or bitten with the worm wheel 482a due to meshing interference and thereby it is no longer possible that they are restored to their normal meshing state by reverse rotation of the motor.

Such a locking state between the lead screw 481 and the worm wheel 482a can be avoided by constructing the rack gear 483 so that it is elastically deformable toward the guide rod 485 as described above. Another approach is, as shown in FIG. 10(b), to construct a lead angle (γ1) of the worm wheel 482a to be larger than a lead angle (γ2) of the lead screw 481 of the sled motor 480 and then to mount the sled motor 480 so that the rotational shaft 480a of the sled motor 480 is tilted for an angle θ with respect to the horizon to achieve a proper meshing between the lead screw 481 of the sled motor 480 and the worm wheel 482a having the above described lead angle (γ1). In this regard, it is to be noted that the lead screw 481 is formed with a left-hand thread as described above.

By mounting the sled motor 480 with its rotational shaft 480a being tilted as described above with reference to FIG. 10(b), it becomes possible for the lead screw 481 to have an apparent lead angle which is larger than the lead angle of the lead screw 481 shown in FIG. 10(a) in spite of using the same lead screws 481. Further, the lead angle of the worm wheel 482a shown in FIG. 10(b) is larger than that of the worm wheel shown in FIG. 10(a). This means that the lead angles of the lead screw 481 and worm wheel 482a become larger. In this way, it becomes possible to reduce slipping when the lead 481 is in mesh with the worm wheel 482a, thereby enabling to effectively prevent a locking state from occurring between the lead screw (worm) 481 and the worm wheel 482a with the simple construction.

Further, according to this arrangement shown in FIG. 10(b), since the lead screw 481 is the same as that used in the arrangement shown in FIG. 10(a) and the number of teeth of the worm wheel 482a is the same as that shown in FIG. 10(a), an amount of the movement of the optical pick-up 30 per one rotation of the rotational shaft 480a of the sled motor 480 is also the same as that of the arrangement shown in FIG. 10(a).

Furthermore, according to this arrangement, the rear portion of the sled motor 480 can be lowered as shown in FIG. 10(b), which creates a space above the rear portion of the sled motor 480, thus leading to expansion of a degree of freedom for design.

Although in the above a description is made with regard to an example where a left-hand thread is formed on the lead screw 481, the present invention is not limited to the example. It is also possible to use a lead screw 481 having a right-hand thread. In this case, the sled motor 480 is mounted so that the rotational shaft 480a of the sled motor 480 is tilted downwardly as shown in FIG. 10(c).

In this embodiment, the optical pick-up 30 can be moved along the guide rod 485 in the radial direction of the optical disc 3 by means of the above described optical pick-up moving mechanism 48.

Figure 14:
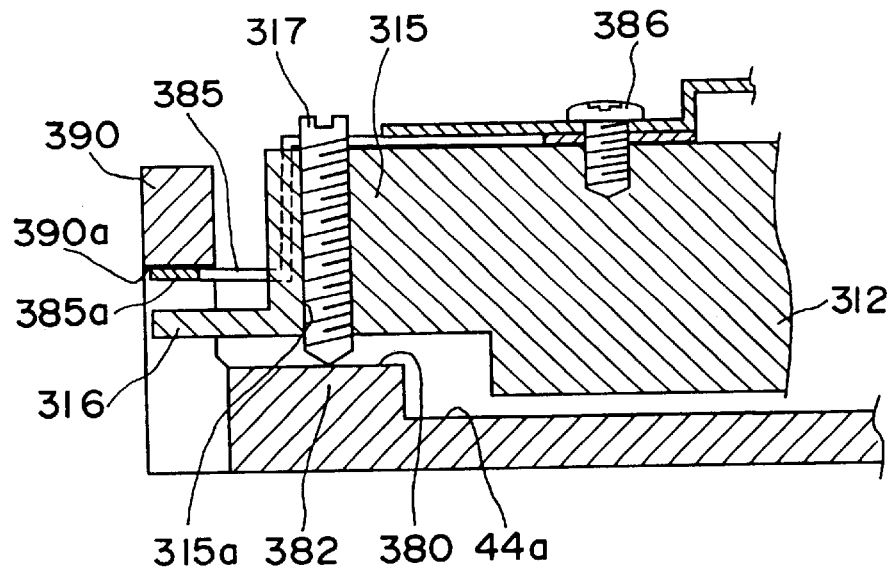
FIG. 14 is a sectional view of a portion of the optical pick-up in which the second tangential skew adjustment mechanism is provided.
Figure 15:
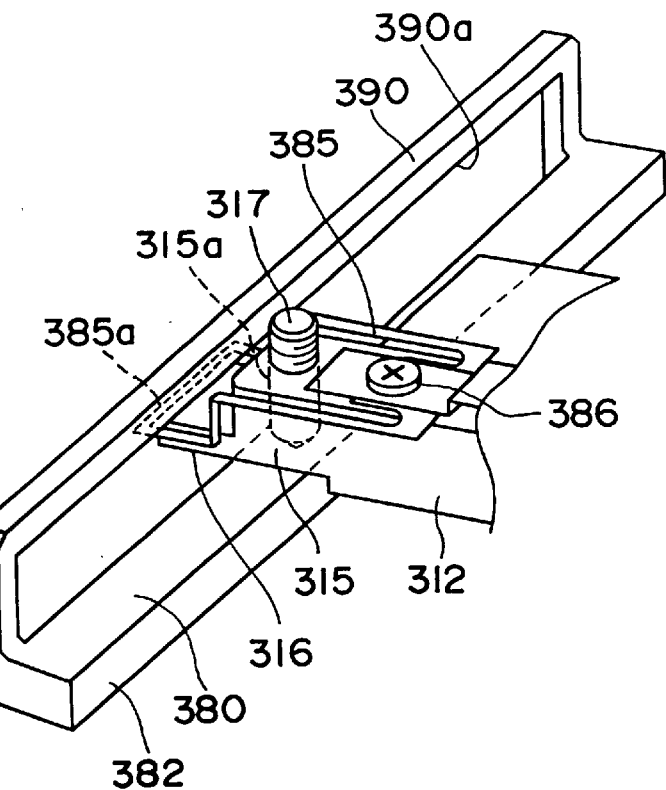
FIG. 15 is a perspective view of a portion of the optical pick-up in which the second tangential skew adjustment mechanism is provided.

Next, a detailed description of the optical pick-up 30 will now be given with reference to FIGS. 11 to 15. In these figures, FIG. 11 is a perspective view of the optical pick-up 30, FIG. 12 is a top planar view of the optical pick-up 30, FIG. 13 is a bottom view of the optical pick-up 30, FIG. 14 is a sectional view which shows the essential portion of the second tangential skew adjustment mechanism for the optical pick-up 30, and FIG. 15 is a perspective view of the pick-up 30.

Figure 11:
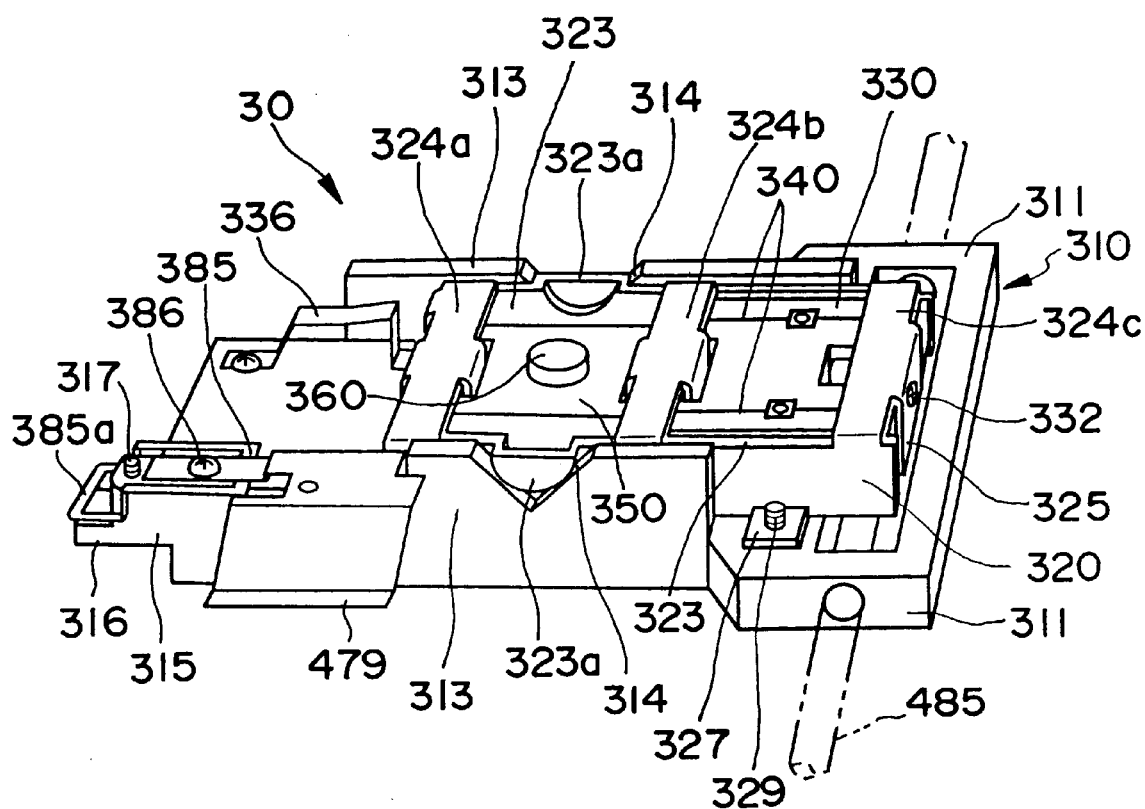
FIG. 11 is a perspective view of an optical pick-up provided in the optical disc drive shown in FIG. 1, to which the skew adjustment mechanism of the present invention is applied.
Figure 12:
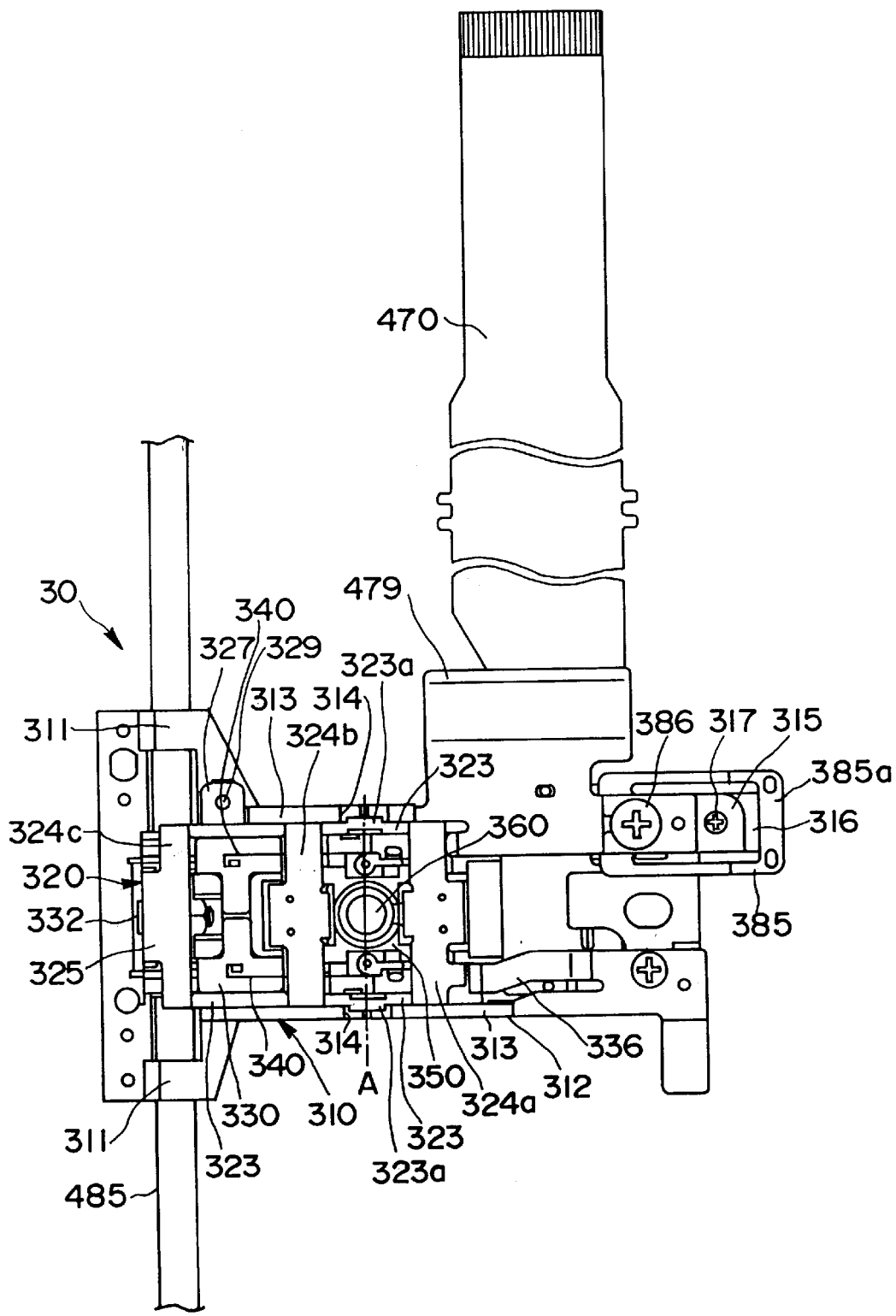
FIG. 12 is a top planar view of the optical pick-up.
Figure 13:
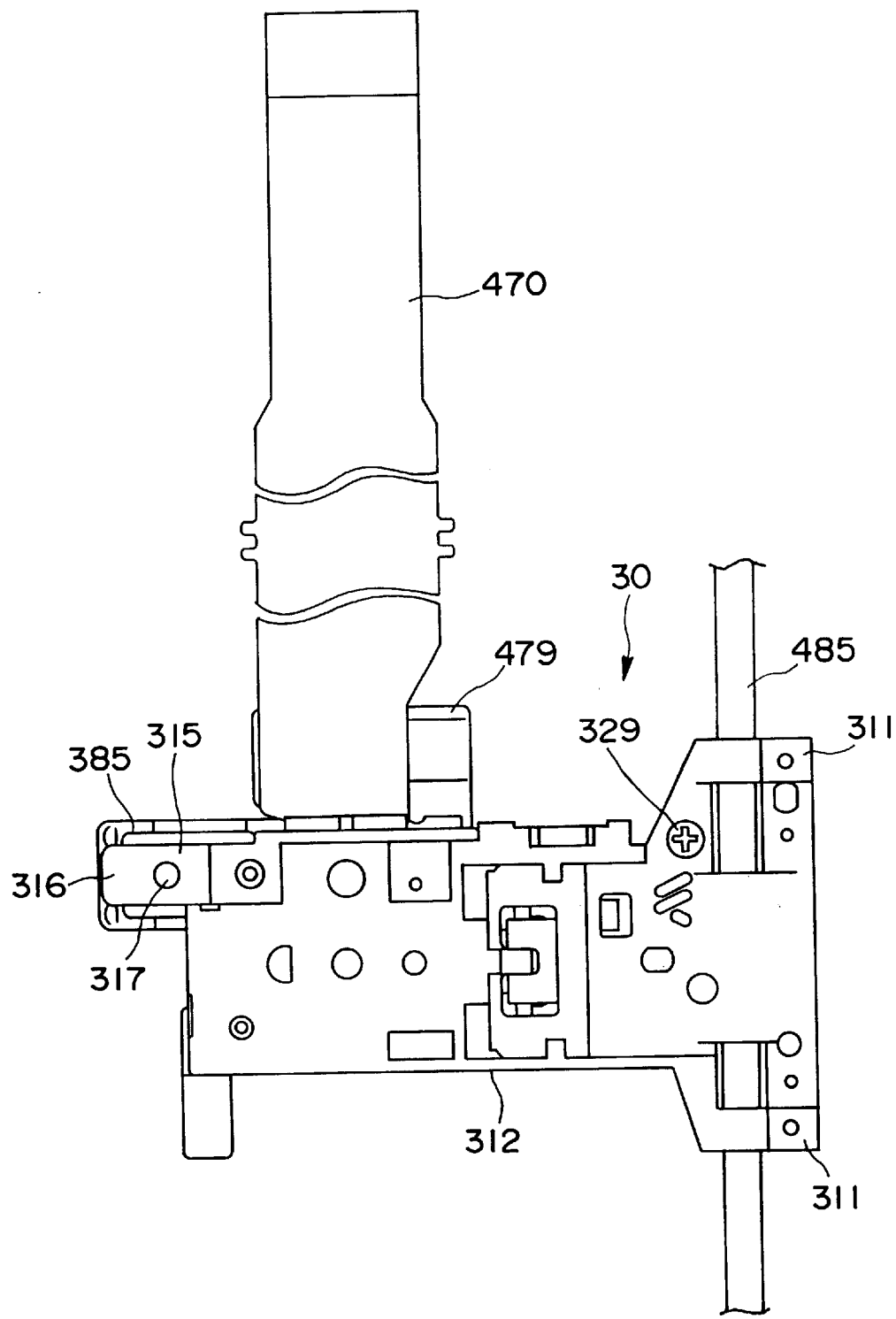
FIG. 13 is a bottom view of the optical pick-up.

As shown in FIGS. 11 to 13, the optical pick-up 30 has a structure similar to the structure of the optical pick-up used in the prior art described above. Namely, the optical pick-up 30 is roughly constructed from a pick-up base 310 which is slidably connected to the guide rod 485, an actuator base 320 which is pivotally supported on the pick-up base 310, a damper base 330 which is mounted on the actuator base 320, a lens holder 350 which is displaceably supported on the damper base 330 via suspension springs 340, and an objective lens 360 which is provided in the lens holder 350.

More specifically, the pick-up base 310 is roughly constructed from bearing portions 311 which include a pair of bearings through a prescribed spacing, into which the guide rod 485 is inserted, and a main body portion 312 integrally formed with the bearing portions 311 at 90 degree angle with respect to the guide rod 485 so as to extend roughly to the right edge of the support member 44. The bearing portions 311 and the main body portion 312 are integrally formed from a metal material such as an aluminum using a diecasting process or the like.

Further, a pair of opposing side walls 313, 313 are provided on both sides of the main body 312 which are spaced along the longitudinal direction the guide rod. Each of these side walls 313 have a notch 314 formed into a V-shaped. As described below, these V-shaped notches 314 are constructed in the form of a pair of pivotal support portions which support the actuator base 320 in a manner that enables the actuator base 320 to pivot about a virtual axis A which is parallel to the guide rod 485 and along a radial direction of the optical disc.

Further, although not shown in the drawings, the main body portion 312 is equipped with an optical system similar to that described above in the prior art example. Namely, the main body portion 312 includes a laser diode (LD) for emitting a laser beam, a beam splitter for reflecting the laser beam from the laser diode toward a mirror, a mirror for reflecting the laser beam from the beam splitter toward the objective lens 360, and a photodiode which is receiving the laser beam reflected from the optical disc via the objective lens 360, the mirror and the beam splitter, and which is generating electrical signals based on the changes in intensity of the laser beam.

The actuator base 320 is provided between the side walls 313 of the pick-up base 310 so as to be pivotal (rockable) about the virtual axis A. the actuator base 320 includes a pair of side wall portions 323, 323 which are positioned inside the side walls 313, 313 of the pick-up base 310, respectively. An upper end portions of these side wall portions 323, 323 are integrally connected to each other by means of connecting portions 324a, 324b and 324c. Further, protruding engagement portions 323a which are engaged with the V-shaped notches 314 are formed on the outside of the side walls 323, 323, respectively, at positions corresponding to the V-shaped notches 314 of the side walls 313, 313 of the pick-up base 310, whereby the actuator base 320 is pivotally supported with respect to the pick-up base 310.

The end portion of the actuator base 320 on the side opposite the guide rod 485 is biased downward by a spring member 336 provided on the main body portion 312 of the pick-up base 310. Further, a tab-shaped convex portion 327 is integrally formed on the lower portion of the side wall 323 of the actuator base 320 at a position close to the guide rod 485. A screw hole is formed in the convex portion 327, and a screw hole is also formed in the portion that corresponds to the bearing portion 311 of the pick-up base 310. Further, a screw 329 is threaded from the bottom surface of the pick-up base 310 through these screw holes. In this embodiment, by adjusting the screw 329, it is possible to pivot the actuator base 320 about the virtual axis A, thereby making it possible to adjust the tangential skew of the actuator base 320 with respect to the pick-up base 310. In the present invention, this mechanism constitutes a first tangential skew adjustment mechanism (means).

Further, on the outer edge of the connecting portion 324*c* of the actuator base 320*a* positioned at the side of the guide rod 485, a downward extending support plate 325 for supporting the damper base 330 is integrally formed. The damper base 330 is fixed to the inside of the support plate 325 by a screw 332. By adjusting the mounting state of the damper base 330 about the axis of the screw 332, it is possible to carry out the radial skew adjustment. Further, although not shown in the drawings, it is possible to arrange a screw and a spring on the underside of the damper base 330 in a manner similar to that mentioned above in the prior art example.

In a vertical direction with respect to the guide rod 485, two pairs of suspension springs 340 extend from both the left and right sides (the top and bottom in FIGS. 11 and 12) of the damper base 330. Secured to the ends of these suspension springs 340 is the lens holder 350. By supporting the lens holder 350 via the suspension springs 340, the lens holder 350 can be displaced in at least the vertical direction (focusing direction) and the horizontal direction (tracking direction).

The lens holder 350 is provided with a tracking servo coil and a focusing servo coil. Two pairs of yokes are integrally formed on the both edges of each of the connecting portions 324*a*, 324*b* downwardly, and magnets are provided in these yokes. These yokes are positioned so as to be able to co-operate with these coils of the lens holder 350. Further, the objective lens 360 is arranged at substantially the central portion of the lens holder 350. The objective lens 360 is used for emitting a laser beam to the optical disc and for receiving the reflected beam therefrom.

Further, the optical pick-up 30 having the above-described structure is provided with a second tangential skew adjustment mechanism (means) in addition to the first tangential skew adjustment mechanism described above. This second skew adjustment mechanism is a mechanism for pivotally displacing the pick-up base 310 about the axis of the guide rod 485. In more detail, the second skew adjustment mechanism has a construction such as those described below.

Namely, as shown in FIGS. 12 and 13, on the end portion of the main body portion 312 of the pick-up base 310 which is opposite to the bearing portions 311, the main body portion 312 includes a protruding portion 315 which protrudes in a vertical direction with respect to the guide rod 485. As clearly shown in FIG. 15, the protruding portion 315 is integrally formed on the rear upper portion (the upper right corner in FIG. 12) of the end surface of the tip portion of the main body portion 312 of the pick-up base 310. As shown in FIGS. 14 and 15, the bottom surface of the protruding portion 315 is one step higher than the bottom surface of the main body portion 312. Further, a guide portion 316 which protrudes toward the outside is integrally formed on the lower portion of the end surface of the tip portion of the protruding portion 314.

As shown in FIGS. 14 and 15, a vertical screw hole 315*a* is formed through the protruding portion 315, and a screw 317 is threaded into the screw hole 315. In this way, by turning the screw 317, the tip of the screw 317 can be made to protrude from the bottom surface of the protruding portion 315.

As shown in FIGS. 14 and 15, the tip of the screw 317 which is screwed into the protruding portion 315 abuts a sliding surface 380 formed below the protruding portion 315 through a prescribed spacing so as to be parallel to the guide rod 485. In this way, the tip of the screw 317 slides on the sliding surface 380 when the optical pick-up 30 moves in the radial direction of the optical disc. Preferably, the tip of the screw 317 is formed so as to have a spherical surface in order to reduce sliding friction.

According to the structure described above, by turning the screw 317 to change the length of the protruding part of the tip of the screw 317 which protrudes from the bottom surface of the protruding portion 315, it is possible to pivotally displace the pick-up base 310 about the axis of the guide rod 485. Namely, the pick-up base 310 is pivotally displaced about the guide rod 485 by adjusting the screw 317, thereby it becomes possible to adjust the tangential skew of the optical pick-up 30. In this regard, it should be noted that the screw 317 provided in the protruding portion 315 functions as a displacement means of the present invention.

The sliding surface 380 is provided along the portion on which the protruding portion 315 of the main body portion 312 slides, when the optical pick-up 30 is moved along the guide rod 485 in a radial direction of the optical disc. Further, as shown in FIG. 15, the sliding surface 380 is formed on the upper surface of an elongated platform 382 which is integrally formed on the bottom portion 44*a* of the support member 44 so as to be one step higher than the bottom portion 44*a*.

Further, above the sliding surface 380, a bar 390 is integrally formed on the support member 44. The bar 390 includes a downward facing abutment surface 390*a* which is parallel to the sliding surface 380, and the bar 390 is positioned at a place which is closer to the side of the wall portion 44*b* of the support member 44. In this way, the abutment surface 390*a* of the bar 390 and the sliding surface 380 define an elongated space, and the guide portion 316 of the protruding portion 315 of the main body portion 312 of the pick-up base 310 is positioned in the elongated.

On the other hand, on the upper surface of the rear side of the tip end portion of the main body portion 312 of the pick-up base 310, a plate spring 385 is secured by means of a screw 386. This plate spring 385 abuts the abutment surface 390*a* of the bar 390 to apply a biasing force to the pick-up base 310 in such a manner that the pick-up base 310 is rotated about the axis of the guide rod 485 toward the direction which causes the tip of the screw 317 to abut the sliding surface 380.

The plate spring 385 functions as a biasing means in the present invention. Specifically, as shown in FIGS. 14 and 15, the plate spring 385 is formed by bending a frame-shaped metal leaf member having a substantially rectangular shape so as to have a step-shaped structure which enables to apply an upward elastic force at the tip end portion 385*a* thereof. In this way, it is possible to apply a biasing force to the pick-up base 310 so as to cause the pick-up base 310 to pivot downwardly about the axis of the guide rod 485. This enables the optical pick-up 30 to move under the condition that the tip of the screw 317 is always being in contact with the sliding surface 380. Further, in order to reduce the sliding friction with the abutment surface 390*a*, a pair of convex portions having spherically-shaped surfaces are formed on the tip end portion 385*a* of the plate spring 385.

According to the optical pick-up 30 having the above-described structure, when the optical pick-up 30 is assembled, radial skew adjustment is carried out by adjusting the screw 332 from the side of the guide rod of the actuator base 320. Further, tangential skew adjustment is carried out by adjusting the screw 329 from the bottom surface of the pick-up base 310 by means of the first tangential skew adjustment mechanism. Then, the optical pick-up 30 which has undergone skew adjustments in this way is assembled into an optical disc drive.

Then, in this state, if a tangential skew adjustment is still required, the screw 317 of the second tangential skew adjustment mechanism is adjusted to appropriately change the protruding length of the tip of the screw 317 which protrudes from the bottom surface of the protruding portion 315. In this way, it is possible to pivotally displace the pick-up base 310 about the axis of the guide rod 485, whereby it becomes possible to adjust the tangential skew of the optical pick-up 30.

According to the second tangential skew adjustment mechanism having the structure described above, it is possible to adjust the tangential skew of the optical pick-up 30 by adjusting the screw 317, even if the optical pick-up 30 has been assembled and then incorporated into an optical disc drive. Further, since the optical pick-up 30 is also equipped with the first tangential skew adjustment mechanism in addition to the second tangential skew adjustment mechanism, by carrying out appropriate skew adjustment with both of the first and second tangential skew adjustment mechanisms, it is possible to adjust the deviation of the optical axis in the tangential direction which is resulted from dimensional dispersions in the components or parts of the chassis and deviations caused upon assembly. With this result, it becomes possible to carry out a more precise skew adjustment, thereby enabling to improve the jitter characteristics of the optical pick-up 30.

In addition, because the optical pick-up 30 having the above-described structure only requires one guide rod, the cost of components can be decreased and the assembly process can be simplified.

Further, the structure of the protruding portion 315 and the plate spring 385 is not limited to the example described above. It is possible to make various changes thereto without departing from the scope of the invention.

As shown in FIGS. 16–19, a flexible printed circuit 470 is connected to the optical pick-up 30 for outputting signals read out from the optical disc 3 and for outputting and inputting various controlling signals used for focusing servo and tracking servo and the like. In the flexible printed circuit 470, a plurality of conductors are arranged for supplying the above-mentioned various signals, so that it has a relatively large width.

Figure 16:
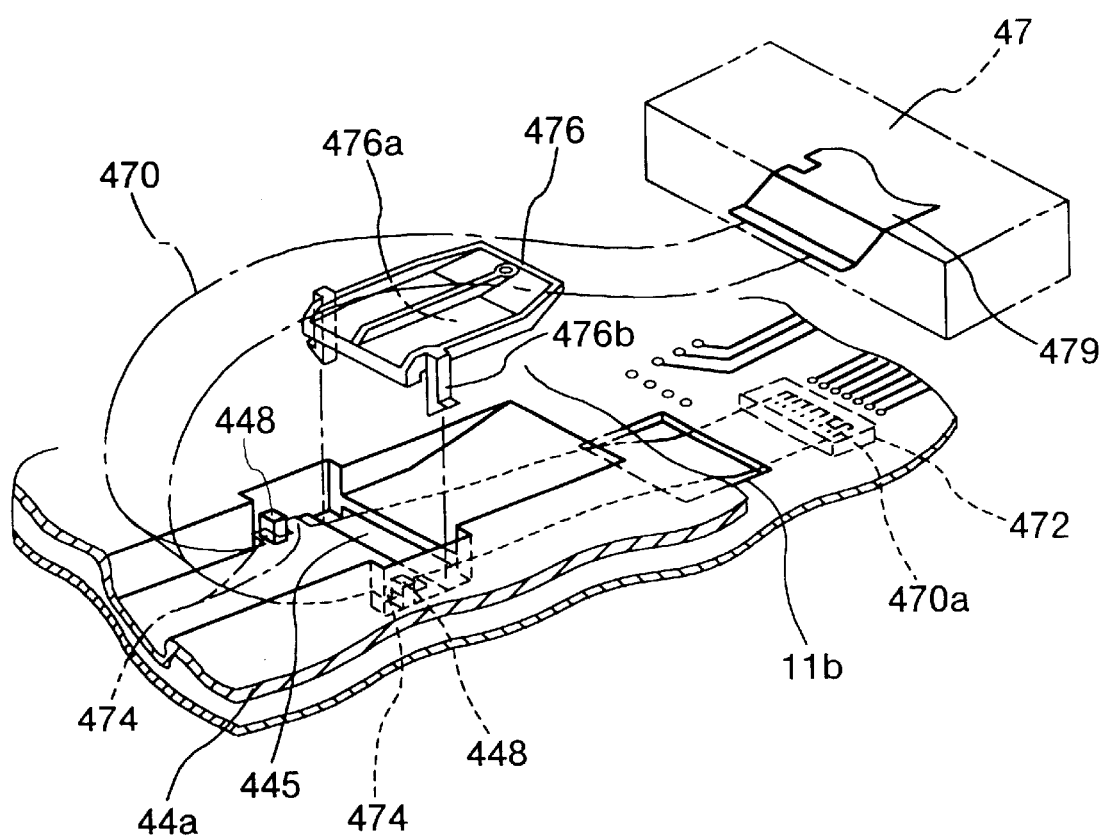
FIG. 16 is a perspective view which shows a connecting state of a flexible printed circuit used in the optical disc drive shown in FIG. 1.
Figure 17:
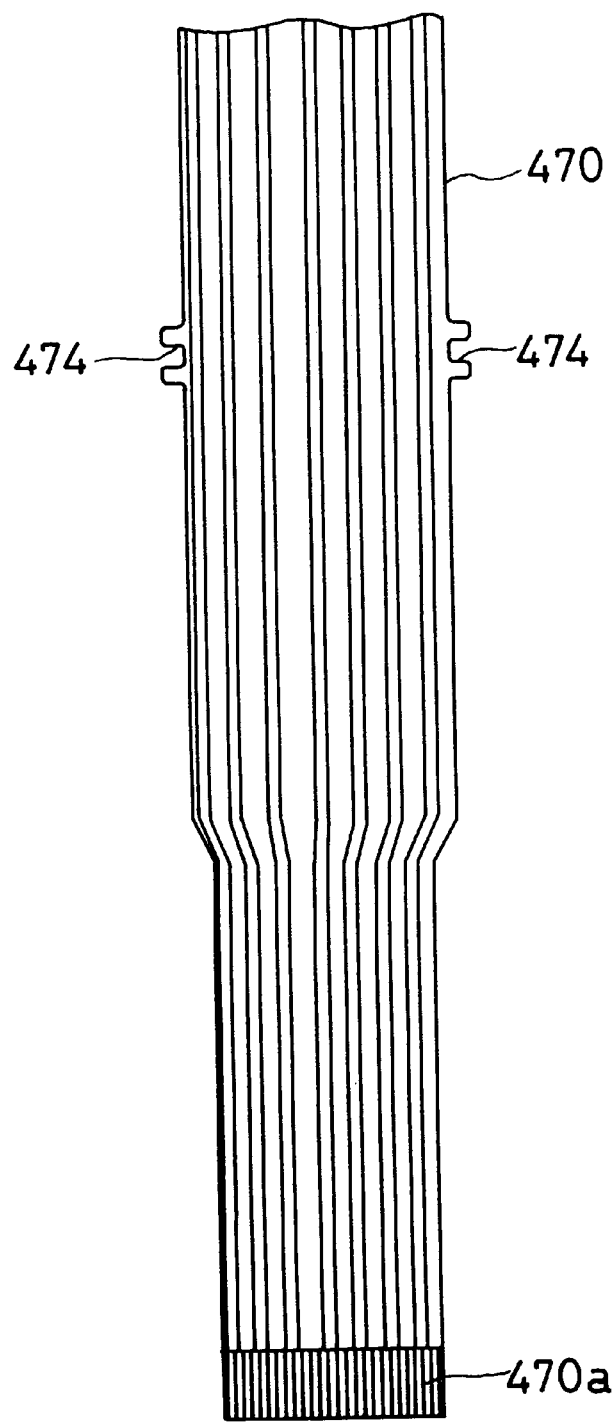
FIG. 17 is a planar view of the flexible printed circuit.

As shown in FIGS. 16 and 17, at the tip end of the flexible printed circuit 470, there is formed a connecting terminal section 470a. As shown in FIG. 2, the flexible printed circuit 470 passes through an opening 445 formed in the bottom portion 44a of the support plate 444 and then passes through an opening 11b formed in the printed circuit board 11, and then the connecting terminal section 470a is connected to a mating connector 472 provided on the underside surface of the printed circuit board 11.

Further, as shown in FIGS. 16, 17 and 19, on the both edges of the roughly middle portion of the flexible printed circuit 470, a pair of engagement portions 474 are integrally formed with the flexible printed circuit 470. These engagement portions are formed into a concaved protrusion, respectively. As described above, these engagement portions 474 are positioned at a roughly middle portion of the flexible printed circuit 470 in its lengthwise direction such that a portion of the flexible printed circuit 470 between the middle portion and the optical pick-up 30 can have a desired curved form as shown in FIG. 16 and FIG. 19, respectively. By giving such a curved form to the portion of the flexible printed circuit 470, the flexible printed circuit 470 can follow the movement of the optical pick-up 30 without giving any load to the optical pick-up 30 when it is being moved. Further, since the portion of the optical pick-up merely repeats a predetermined deformation according to the movement of the optical pick-up 30, there is no risk that the flexible printed circuit 470 contacts the signal surface of the optical disc 30 and it is caught by surrounding parts.

As shown in FIGS. 7, 16 and 19, the opening 445 through which the flexible printed circuit 470 extends is formed in a concave portion 447 provided in the bottom portion 44a of the support member 44. This opening 445 is formed into an elongated slit having a width slightly larger than the width of the flexible printed circuit 470. In the vicinity of the opening 445 on the opposite side to the optical pick-up 30, there are provided a pair of protrusions 448 which are integrally formed on left and right walls defining the concave portion 447, as shown in FIGS. 7 and 16. The engagement portions 474 formed on the left and right edges of the flexible printed circuit 470 are adapted to be in engagement with these protrusions 448, respectively.

Figure 18A:
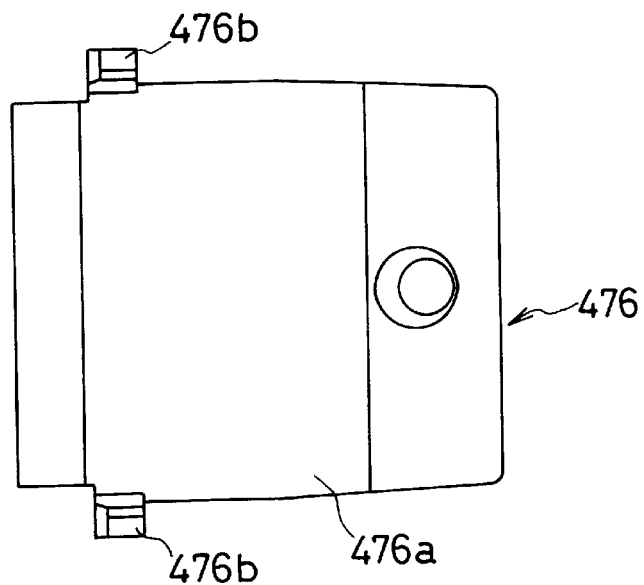
FIGS. 18(*a*), 18(*b*) and 18(*c*) are a planar view, a side view and a bottom view of an opening closure member, respectively.
Figure 18B:
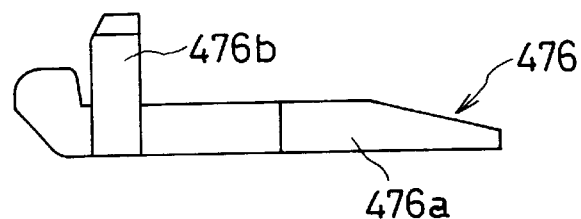
Figure 18C:
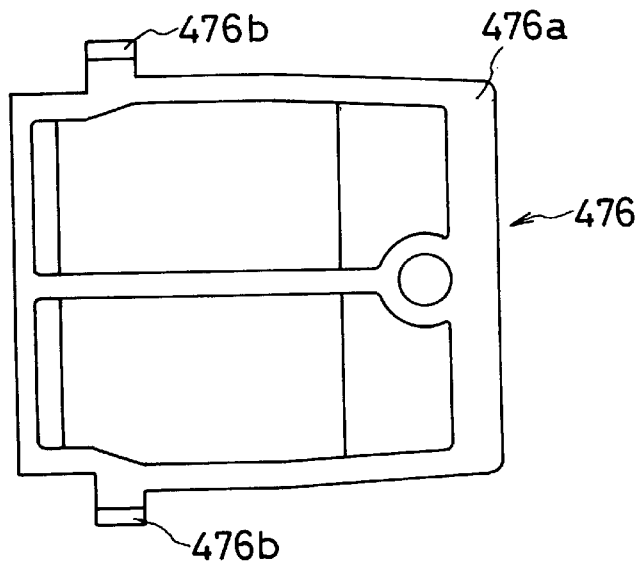

Further, an opening closure member 476 shown in FIG. 2 and FIG. 16 is removably attached to the opening 445. As shown in FIGS. 18(a), 18(b) and 18(c), the opening closure member 476 is generally constructed from a plate-like member 476a which is fitted onto the concave portion 447 of the bottom portion 44a of the support member 44 and a pair of leg portions 476b which are integrally formed with the plate-like member 476a so as to protrude downwardly from the left and right edges of the plate-like member 476a. These leg members 476b are elastically deformable to the direction that they approach to each other. Further, on the tip portion of each leg, there is formed an engagement hook.

In use, first, the left and right engagement portions 474 of the flexible printed circuit 470 which passes through the opening 445 are engaged with the left and right protrusions 448 formed on the walls defining the concave portion 447, respectively. In this state, the leg members 476b of the opening closure member 476 are inserted into the opening 445 from the both sides of the flexible printed circuit 470, thereby the opening closure member 476 can be removably attached to the opening 445.

As a result, the flexible printed circuit 470 is accurately positioned in its lengthwise direction with respect to the chassis (support member 44) due to the engagement between the engagement portions 474 and the protrusions 484. Accordingly, even if the pick-up 30 is moved, the flexible printed circuit 470 does not move in its lengthwise direction, thereby enabling to maintain the curved form shown in FIG. 16 and FIGS. 19(a) and 19(b). Further, when the flexible printed circuit 470 is pulled by the motion of the pick-up 30 toward the inner side of the optical disc 3, such a pulling force is not transmitted to the printed circuit board 11, thereby enabling to prevent the connecting terminal section 470a is disconnected from the connector 472. Furthermore, since the opening 445 is being closed by the plate-like member 476a of the opening closure member 476, it is possible to prevent dust or dirt from entering into the space above the chassis 40 through the opening 445 due to a sucking force crated by the rotation of the optical disc 3.

Furthermore, at a portion of the optical pick-up 30 where the flexible printed circuit 470 is connected to the pick-up 30, there is provided a regulating member 479 which regulates an extending direction of the flexible printed circuit 470 from the optical pick-up 30 so as to give a predetermined curved form to the flexible printed circuit 470. This regulating member 479 is formed of a metallic plate having a width slightly larger than the width of the flexible printed circuit 470. In more detail, the regulating member 479 has a flat plate portion mounted onto the upper surface of the optical pick-up 30 and a slanting plate portion extending slantingly and downwardly from the flat plate portion, and the tip portion of the slanting plate portion is bent horizontally.

In this arrangement, since the flexible printed circuit 470 is held by the regulating member 479 from the upper side thereof, the flexible printed circuit 470 extends from the connecting portion with the optical pick-up 30 slantingly and then it is held by the tip portion of the regulating member 479. In this way, even if the optical pick-up 30 moves from the inner side of the optical disc 3 shown in FIG. 19(a) to the outer side thereof shown in FIG. 19(b), the flexible printed circuit 470 can maintain its ideal curved form, thereby enabling to prevent the flexible printed circuit 470 from contacting the signal surface of the optical disc 3. Further, a load exerted on the flexible printed circuit 470 by the movement of the optical pick-up 30 is relieved by the regulating member 479, so that the load exerted on the flexible printed circuit 470 does not affect the connecting portion between the flexible printed circuit 470 and the optical pick-up 30 directly.

In this embodiment, the sled motor 480 of the optical pick-up moving mechanism 48 is controlled by a controlling means (CPU) provided on the printed circuit board 11 together with the spindle motor and the loading motor 61 described hereinafter in detail.

In this case, in order to drive the motor with a small voltage at the start of the rotation, it is preferred that the sled motor 480 is controlled such that its rotational shaft 480a is being slightly oscillated by supplying high and low pulses to the coil in a predetermined interval. In this way, it is not necessary to apply a large voltage to the motor at the start of the rotation. This is particularly suited for the case where a fine feed of the pick-up 30 is required during writing or reading operation being carried out. In the case of the small size motor like the sled motor used in the optical pick-up moving mechanism of the CD-R drive, a pulse voltage of 40 Hz can be applied, for example.

As shown in FIG. 3 and FIG. 4, in front of the mechanism unit 42, there is provided a loading mechanism 50 for displacing the mechanism unit 42 between the lowered position (FIG. 3) and the raised position (FIG. 4) and for moving the disc tray 5 between the loaded position and the eject position. This loading mechanism 50 comprises a cam mechanism 51 which is operatively coupled with the mechanism unit 42 and can be moved between a first position (FIG. 3) and a second position (FIG. 4) and a driving mechanism 60 for driving the disc tray 5 and the cam mechanism 51.

The cam mechanism 51 can be operated to move the mechanism unit 42 to either the lowered position when the cam mechanism 51 is in the first position shown in FIG. 3, or the raised position when the cam mechanism 51 is in the second position shown in FIG. 4. In more details, as shown in FIGS. 20 and 21, the cam mechanism 51 includes a cam member 55 arranged so as to be slidable between a first position (FIG. 20) and a second position (FIG. 21) in the sideways direction with respect to the chassis 40 (i.e., the vertical direction with respect to the direction of movement of the disc tray 5). The cam member 55 is generally constructed from a roughly plate-shaped horizontal portion 55a and a plate-shaped vertical portion 55b which is integrally formed on the underside surface of the horizontal portion 55a at a position close to the rear edge (at the side of the mechanism unit) so as to be perpendicular to the horizontal portion. That is, the cam member 55 is formed from a member having a roughly T-shaped cross section. This structure can prevent camber from being produced upon cooling process in the injection molding of resin materials.

Formed on the horizontal portion 55a of the cam member 55 are sideways guide grooves 56a, 56b which engage respectively with a pair of protrusions 52a, 52b which protrude from the top of the front portion of the chassis 40. These guide grooves 56a, 56b are used to guide the cam member 55 between the first and second positions. Further, the underside surface of the horizontal portion 55a is provided with a sideways engaging pin (not shown in the drawings) which is inserted into an elongated slot formed in the top of the front portion of the chassis 40. This engaging pin is adapted to interlock with an emergency eject mechanism 90 (described below).

Further, on the horizontal portion 55a of the cam member 55, there is formed a disc tray locking portion 55d which is engaged with the rib 5c formed on the rear surface of the disc tray 5 when the cam member 55 is displaced from the first position to the second position in order to restrict the movement of the disc tray 5.

The vertical portion 55b of the cam member 55 is positioned to face the front wall which defines the opening 41 of the chassis 40. Formed in the vertical portion 55b are a pair of cam grooves 58a, 58b each having the same shape. Each of the cam grooves 58a, 58b are constructed from a horizontally extending upper and lower grooves 581, 583 and a slanting groove 582 which connects the upper groove 581 and lower groove 583, respectively.

Further, the guide pins (following members) 430a, 430b which are provided on the front surface of the base frame 43 of the mechanism unit 42 as described above are inserted into the cam grooves 58a, 58b, respectively. In this way, when the cam member 55 is moved between the first position and the second position, the guide pins 430a, 430b are slidably moved along the cam grooves 58a, 58b in the up and down direction.

Namely, when the cam member 55 is positioned at the first position, the guide pins 430a, 430b are engaged with the lower grooves 583 (FIG. 20), and the front portion of the mechanism unit 42 is in the lowered position shown in FIG. 3. When the cam member 55 is moved from the first position to the second position, the guide pins 430a, 430b are moved up by the slanting grooves 582, thereby causing the front portion of the mechanism unit 42 to move from the lowered position toward the raised position. Then, when the cam member 55 reaches the second position, the guide pins 430a, 430b engage with the upper grooves 581 (FIG. 21), and the front portion of the mechanism unit 42 is displaced to the raised position shown in FIG. 4.

Further, a protrusion 59 is integrally formed on an end portion of the horizontal portion 55a of the cam member 55 to engage with the cam member movement restricting groove 7 formed in the underside surface of the disc tray 5. As a result, when the protrusion 59 is engaged with the first movement restricting groove 7a of the disc tray 5, the cam member 55 is prevented from moving in the sideways direction, whereby the cam member 55 is held at the first position. Then, in accordance with the movement of the disc tray 5 toward the playback position, the protrusion 59 slides from the first movement restricting groove 7a to the second movement restricting groove 7b, and upon moving through the slanting groove of the second movement restricting groove 7b, the cam member 55 is caused to displace within the range of the lower grooves 583 of the cam grooves 58a, 58b of the cam member 55. Then, when the protrusion 59 reaches the position of the third movement restricting groove 7c, the cam member 55 is allowed to move toward the second position.

In this connection, it is to be noted that when the cam member 55 is displaced to the second position, the disc tray locking portion 55d formed on the horizontal portion 55a of the cam member 55 is engaged with the rib 5c formed on the underside surface of the disc tray 5 as described above, thereby the disc tray 5 is restricted to move further, that is the disc tray 5 being locked up.

As shown in FIG. 20 and FIG. 21, the drive mechanism 60 of the loading mechanism 50 comprises a loading motor (DC motor) 61 capable of forward/reverse rotation provided on the underside surface of the front portion of the chassis 40, a pinion gear 62 mounted to a rotation axis 61a of the loading motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxially therewith. Meshing with the small gear 64a of the third gear 64 is an operative gear 65 which also meshes with the first and second racks 6a, 6b of the disc tray 5. Namely, the operative gear 65 is constructed from a lower gear 65a which meshes with the small gear 64a of the third gear 64, and an upper gear 65b which meshes with the rack 6 of the disc tray 5, in which the upper gear 65b being integrally formed on the same axis as the lower gear 65a.

In this embodiment, the gears 62–65 are flat teeth gears, and a combination thereof constitutes a rotational speed reduction mechanism for the loading motor 61 in the loading mechanism 50.

The operative gear 65 is rotatably mounted to a rotation axis 67 provided on a planetary arm 66, and this planetary arm 66 is rotatably mounted to a rotation axis 64b of the third gear 64. The planetary arm 66 includes a rotation portion 66a which is rotatable fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 described above to which the operative gear 65 is rotatable mounted. Namely, the operative gear 65 rotates about the axis 67 of the first arm 66b which is served as a rotation axis thereof while the operative gear 65 also turns around the axis 64b which is served as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward, and the tip portion of this pin 68 is fitted into an engaging portion 55c formed in the cam member 55.

In this connection, as shown in FIG. 20 and FIG. 21, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the operative gear 65 being held at a prescribed position, and a second operation when engaged with the second rack 6b of the disc tray 5, in which the cam member 55 is moved between the first position and the second position by the revolution of the operative gear 65.

Specifically, while the protrusion 59 provided on the top of the horizontal portion 55a of the cam member 55 is in engagement with the first movement restricting groove 7a formed on the underside surface of the disc tray 5, the movement of the cam member 55 from the first position to the second position is restricted. Accordingly, during such time, in other words during the time that the disc tray 5 is moving between the eject position and the loaded position, the pin 68 of the second arm 66c of the planetary arm 66 is engaged with the engaging portion 55c of the cam member 55, thereby making it impossible for the planetary arm 66 to be turned about the axis 64b. As a result, the operative gear 65 is being held at a prescribed position while the protrusion 59 of the cam member 55 is engaged with the first movement restricting groove 7a of the disc tray 5. In this state, as shown by the dashed line in FIG. 3, the operative gear 65 engages with the first linear rack 6a of the disc tray 5, whereby the disc tray 5 is moved from the disc eject position to the disc loaded position according to the rotation of the operative gear 65 caused by the rotation of the loading motor 61, and in this way the operative gear 65 acts as a driving gear for moving the disc tray 5.

On the other hand, when the disc tray 5 moves accordingly to a position just before the disc loaded position, the protrusion 59 of the cam member 55 moves from the first movement restricting groove 7a to the second movement restricting groove 7b of the disc tray 5, and this causes the cam member 55 to be displaced in the sideways direction (toward the second position) by a small amount. When the disc tray 5 moves further, the protrusion 59 reaches the third movement restricting groove 7c, whereby the cam member 55 is allowed to move from the first position to the second position. In this state, as shown by the dashed line in FIG. 4, since the operative gear 65 is engaged with the arc-shaped second rack 6b and the cam member 55 is able to move to the second position and therefore the planetary arm 66 can be turned about the axis 64b, the operative gear 65 moves along the arc-shaped second rack 6b in accordance with the rotation of the loading motor 61. Namely, the operative gear 65 acts as a planetary gear.

In accordance with such a turning movement of the operative gear 65, the planetary arm 66 rotates clockwise about the common axis (revolution axis) 64b from the position shown in FIG. 20 to the position shown in FIG. 21, which in turn causes the second arm 66c of the planetary arm 66 to rotate in the same direction. In accordance with this rotation of the second arm 66c, the cam member 55 is driven by means of the pin 68 coupled with the engaging portion 55c, and thereby the cam member 55 moves toward the second position shown in FIG. 16 from the first position shown in FIG. 15. In accordance with this movement of the cam member 55 from the first position toward the second position, the front guide pins 430a, 430b of the base frame 43 of the mechanism unit 42 move up along the slanting grooves 582, 582, whereby the front portion of the mechanism unit 42 is also displaced from the lowered position shown in FIG. 3 to the raised position shown in FIG. 4.

Figure 22:
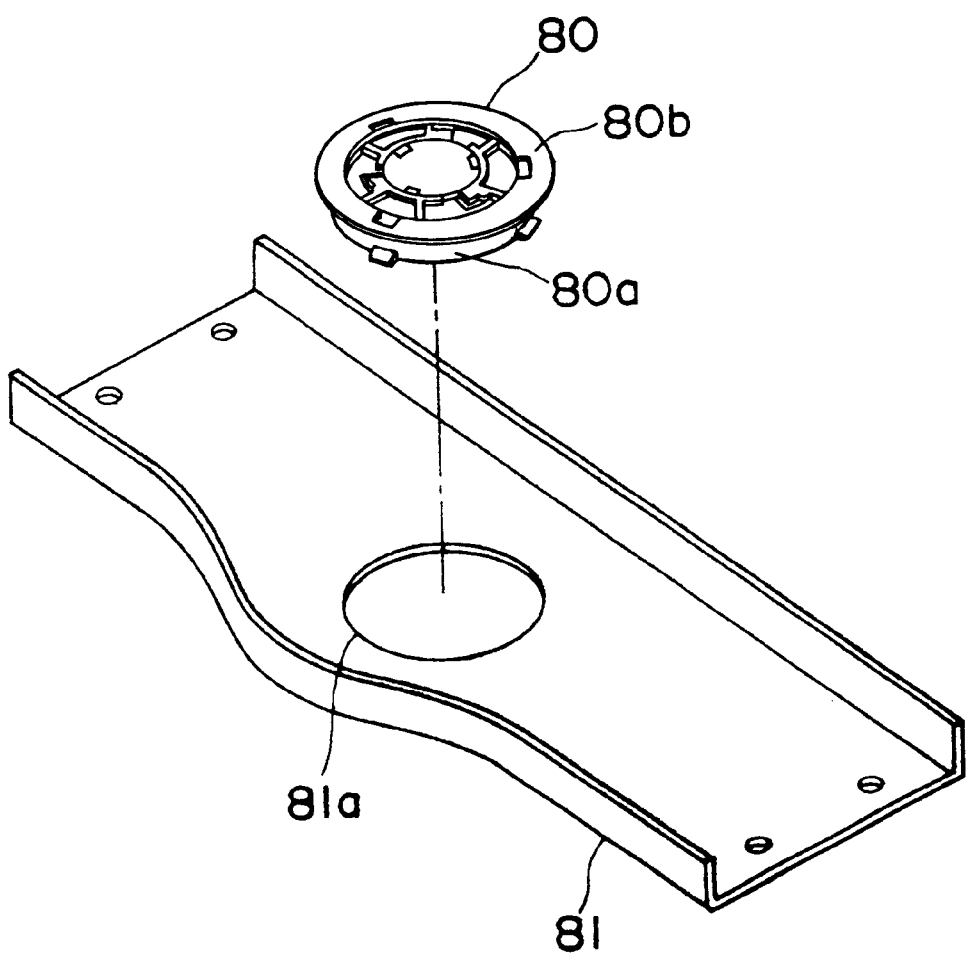
FIG. 22 is a perspective view which shows the structure of a disc clamper used in the optical disc drive shown in FIG. 1.
Figure 23:
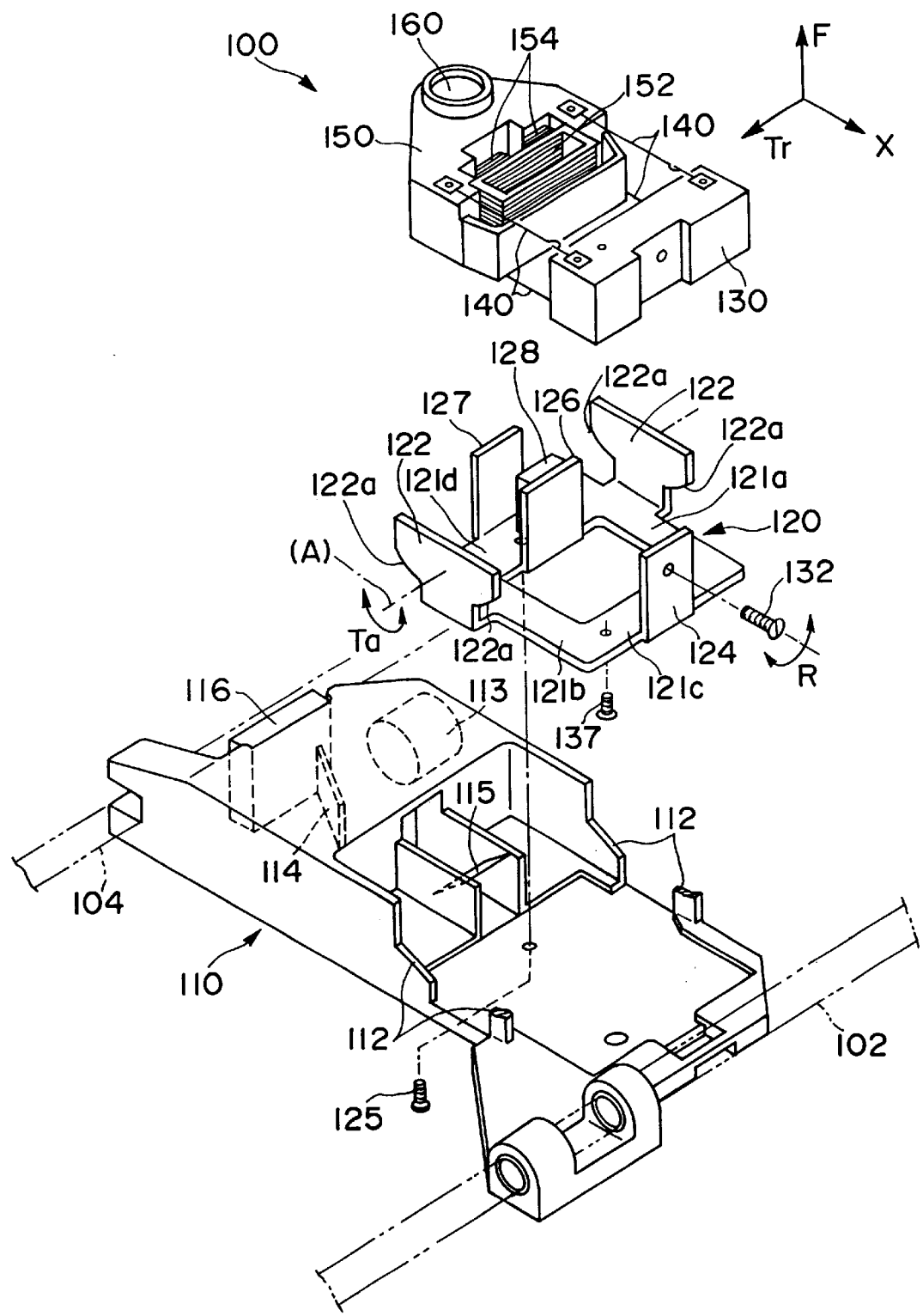
FIG. 23 is a perspective view of the prior art optical pick-up.
Figure 24:
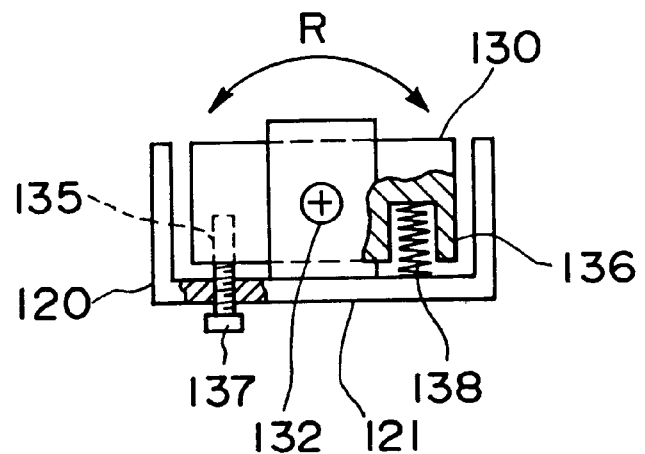
FIG. 24 is an explanatory drawing which shows the principle of the radial skew adjustment mechanism of the prior art optical pick-up.
Figure 25:
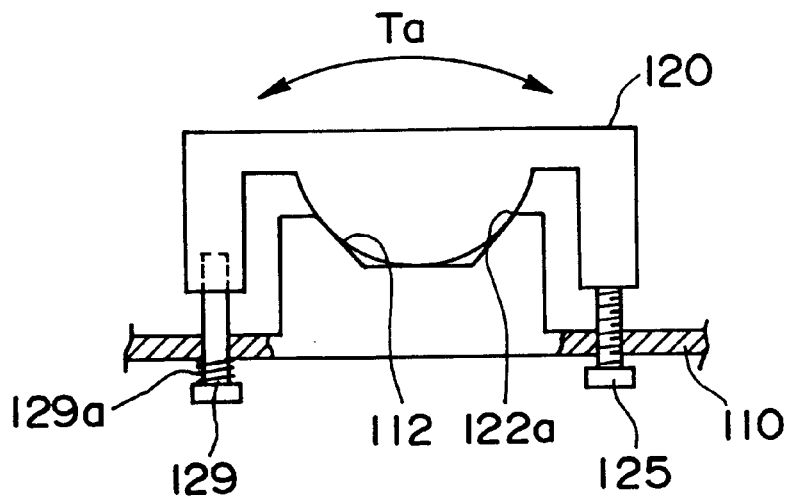
FIG. 25 is an explanatory drawing which shows the principle of the tangential skew adjustment mechanism of the prior art optical pick-up.

Further, a disc damper 80 is provided on the upper portion of the chassis 40. As shown in FIG. 22, the disc clamper 80 is rotatably supported by a plate-shaped support member 81 having a central opening 81a.

In more detail, the support member 81 is mounted onto the chassis 40 in the side-ways direction by being fastened at both ends thereof to mounting portions 40c of the chassis 40 with bosses (or rivets). On the other hand, the disc clamper 80 is formed from a flat drum-shaped main body 80a having a bottom portion that is to be inserted into the opening 81a of the support member 81, and a flange portion 80b which is formed around the upper circumferential portion of the main body 80a. The flange portion 80b is adapted to abut the top of the support member 81. Further, an annular steel attraction member is provided inside the main body 80a and is adapted to be pulled by the permanent magnet provided in the turntable 46.

Further, indicated by the reference numeral 90 in FIG. 2 to FIG. 4 is an emergency eject mechanism for the disc tray 5. This emergency eject mechanism 90 is provided for ejecting an optical disc 3 placed on the disc tray 5 in case the loading motor 61 is disabled to operate due to a power outage or the like when the optical disc 3 is being rotated for playback. Namely, in this emergency eject mechanism 90, a jig (not shown) is inserted into the main body 2 from the outside to forcedly displace the cam member 55 from the second position to the first position to push out a tip portion of the disc tray from the main body 2, and then the disc tray 5 is manually moved forward to eject the optical disc 3.

Hereinbelow, a description is made with regard to an operation of the skew adjustment mechanism for the optical pick-up used in the optical disc drive according to the present invention.

First, when the optical pick-up is assembled, the radial skew is adjusted by adjusting the screw 332 from the side of the guide rod, and the tangential skew is adjusted by adjusting the screw 329 from the underside of the pick-up base 310 by means of the first tangential skew adjustment mechanism. Then, the optical pick-up 30 to which such skew adjustments having been carried out is assembled into a disc drive.

In this state, if tangential skew adjustment is still required, the screw 317 of the second tangential skew adjustment mechanism is adjusted to appropriately change the length of the screw 317 which protrudes from the bottom surface of the protruding portion 315. In this way, it is possible to pivotally displace the pick-up base 310 about the axis of the guide rod 485, thereby enabling to adjust the tangential skew of the optical pick-up 30.

In this case, the pick-up base 310 is being biased by the plate spring 385 such that the pick-up base is pivoted downwardly about the axis of the guide rod 485. With this result, the tip of the screw 317 is always being in contact with the slide surface 380.

According to the optical pick-up 30 having the structure described above, even if the optical pick-up 30 has been assembled and incorporated into an optical disc drive, it is still possible to adjust the tangential skew of the optical pick-up 30 by adjusting the screw 317 of the second tangential skew adjustment mechanism. Further, since the optical pick-up 30 is also equipped with the first tangential skew adjustment mechanism in addition to the second tangential skew adjustment mechanism, it is possible carry out skew adjustment with even higher precision by carrying out adjustments with both tangential skew adjustment mechanisms. With this result, it becomes possible to improve the jitter characteristics of the optical pick-up 30.

In addition, since the optical pick-up 30 having the above-described structure only requires one guide rod, the cost of components is decreased and the assembly process is simplified.

Next, a description of the operation of the disc drive 1 having an optical pick-up to which the skew adjustments have already been carried out as described above will be given.

When the disc drive 1 is not in use, the empty disc tray 5 is housed inside the casing 10 (inside the main body 2), that is the disc tray 5 is in the disc loaded position (disc play back position). In this state, as shown in FIG. 4, the mechanism unit 42 is in the raised position, the cam member 55 is in the second position shown in FIG. 20, and the protrusion 59 of the horizontal portion 55a of the cam member 55 is in the third movement restriction groove 7c. Further, as shown by the dashed lines in FIG. 4, the operative gear 65 of the drive mechanism 60 is in engagement with an end portion of the second rack 6b which is far away from the first rack 6a thereof.

Now, if an eject operation is carried out, the loading motor 61 will rotate in a prescribed direction, whereby the operative gear 65 is caused to rotate in the clockwise direction shown in FIG. 4 through the rotational speed reduction mechanism. In this state, the operative gear 65 acts as a planetary gear which can be turned around the revolution axis 64b, and in accordance with this revolution, the operative gear 65 moves along the second rack 6b toward the first rack 6a. In accordance with the revolution of the operative gear 65, the planetary arm 66 rotates in the counterclockwise direction about the revolution axis (common axis) 64b. In accordance with the rotation of the planetary arm 66, the second arm 66c causes the cam member 55 to move, via the pin 68, from the second position shown in FIG. 4 (FIG. 21) to the first position shown in FIG. 3 (FIG. 20), whereby the mechanism unit 42 is also moved from the raised position to the lowered position. In this case, while the cam member 55 is moving from the second position to the first position, the protrusion 59 on top of the horizontal portion 55a of the cam member 55 slides along the third movement restricting groove 7c and then reaches the first movement restricting groove 7a via the second movement restricting groove 7b.

At that point, the operative gear 65 moves from the arc-shaped second rack 6b to the linear first rack 6a, and the protrusion 59 of the cam member 55 also moves from the second movement restricting groove 7b to the first movement restricting groove 7a. When the protrusion 59 of the cam member 55 is moved to the first movement restriction groove 7a, the cam member 55 is restricted from moving in the sideways direction, so that the rotation of the planetary arm 66 is also restricted. In this state, the operative gear 65 acts as a driving gear to drive the disc tray 5 with being held at that position. As a result, as shown by the dashed line in FIG. 3, the operative gear 65 engages with the first rack 6a of the disc tray 5, whereby the disc tray 5 is moved from the loaded position to the eject position according to the rotation of the motor 61. In this state, the mechanism unit 42 has been displaced to the lowered position at a prescribed spacing from the disc clamper 80. Accordingly, the disc damper 80 and the turntable 46 do not hinder the eject operation of the disc tray 5.

Now, if a loading operation is carried out by placing the optical disc 3 into the disc supporting portion 5a of the disc tray 5 which has been ejected to the outside through the aperture 15a of the front panel 15, the loading motor 61 will rotate in the reverse direction (i.e., the direction opposite to the direction described above), thereby causing the operative gear 65 to rotate, via the rotational speed reduction mechanism, in the counterclockwise direction (i.e., reverse direction) shown in FIG. 3. Accordingly, the disc tray 5 moves backward (toward the rear of the disc drive) through the aperture 15a to the disc loaded position. In this way, the optical disc 3, which is supported at a prescribed position on top of the disc tray 5, is also transported to the disc loaded position (disk play back position) inside the main body 2.

During the loading operation of the disc tray 5, namely while the disc tray 5 is moving backward, the operative gear 65 engages with the first rack 6a on the underside surface of the disc tray 5, and the protrusion 59 of the cam member 55 is guided along the first movement restriction groove 7a. Accordingly, the cam member 55 is held at the first position, and is therefore unable to move to the second position. Consequently, the planetary arm 66 is held at a prescribed position so as to be unable to rotate. In this case, the operative gear 65 rotates at that position, so that it acts as a driving gear for driving the disc tray 5. Further, in this state, the front portion of the mechanism unit 42 is held at the lower position.

When the disc tray 5 approaches the disc loaded position, the protrusion 59 formed on the cam member 55 moves from the first movement restriction groove 7a to the second movement restriction groove 7b, thereby causing the cam member 55 to move slightly in the sideways direction. Then, when the disc tray 5 reaches the disc loaded position, the protrusion 59 of the cam member 55 has moved to the third movement restriction groove 7b via the second movement restriction groove 7b, thereby enabling the cam member 55 to move from the first position to the second position, which in turn also makes it possible for the planetary arm 66 to rotate. In this state, the operative gear 65 moves from the first rack 6a to the second rack 6b.

In this state, the movement of the disc tray 5 is restricted while the planetary arm 66 is capable of revolution. Therefore, if the operative gear 65 is rotated by the loading motor 61, the operative gear 65 moves and turns along the arc-shaped second rack 6b around the axis 64b. Therefore, in this state, the operative gear 65 acts as a planetary gear.

When the operative gear 65 acts as a planetary gear and moves along the arc-shaped second rack 6b as described above, the planetary arm 66 also rotates in accordance with the movement of the operative gear 65 around the revolution axis (common axis) 64b in the clockwise direction shown in FIG. 3. When the planetary arm 66 rotates in this way, the second arm 66c of the planetary arm 66 also rotates in the same manner in the clockwise direction, thereby causing the cam member 55 to move from the first position to the second position.

In accordance with the movement of the cam member 55, the guide pins 430a, 430b of the front end of the base frame 43 of the mechanism unit 42 slide along the slanting grooves 582 of the cam grooves 58a, 58b and move upward to the upper grooves 581. Accordingly, the mechanism unit 42 is displaced from the lowered position to the raised position, whereby the center hub 46a of the turntable 46 fits into the central hole 3a of the optical disc 3 which is placed on the disc tray 5 and has been transported to the disc loaded position. Then, the disc clamper 80 is pulled by the pulling force of the permanent magnet of the turntable 46, and then the optical disc 3 is clamped between the turntable 46 and the disc clamper 80.

In this state, if an operation such as a playback operation is carried out, the spindle motor 45 is operated to rotate the turntable 46 in prescribed speeds, thereby making it possible to playback the optical disc 3 or record information thereto. On the other hand, when playback is finished or when playback is stopped in order to switch to another disc, unloading operation (ejecting operation) is carried out by operating an eject button or the like. When this is done, the operation described above is carried out in a revered order.

Finally, it is to be understood that the present invention can be applied to not only CD-R drives but also other disc drives such as CD-ROM drives, CD-RW drives, DVD-drives and the like. Further it is also to be understood that many changes and additions may be made to the embodiments described above without departing from the scope and spirit of the invention as defined in the appended claims.

What is claimed is:

1. A skew adjustment mechanism for an optical pick-up used in an optical disc drive, the optical pick-up being provided in the disc drive freely movable in a radial direction of an optical disc along only one fixedly and unmovably provided single guide rod for playing back or recording and playing back to the optical disc, wherein the skew adjustment mechanism comprises:

a tangential skew adjusting means for adjusting tangential skew of the optical pick-up after the optical pick-up has been assembled into the disc drive wherein the optical pick-up includes a pick-up base having a first end and a second end opposite to the first end, the first end being slidably connected to the guide rod, and the tangential skew adjusting means includes a displacement means provided on the second end of the pick-up base for rotationally displacing the pick-up base about an axis of the guide rod and further wherein the second end of the pick-up base includes a bottom surface, in which the displacement means includes a screw which vertically passes through the second end of the pick-up base such that a lower end portion of the screw protrudes from the bottom surface of the pick-up base and a sliding surface positioned a prescribed distance below the bottom surface of the second end of the pick-up base so that the lower end portion of the screw is in contact with the sliding surface, whereby the pick-up base can be displaced by adjusting the protruding length of the lower end portion of the screw.

2. The skew adjustment mechanism as claimed in claim 1, wherein the tangential skew adjusting means further includes a biasing means for biasing the pick-up base in a direction which causes the lower end portion of the screw to abut the sliding surface.

3. The skew adjustment mechanism as claimed in claim 2, wherein the biasing means includes a plate spring provided on the second end of the pick-up base and a downward facing abutment surface provided a prescribed distance above the sliding surface, and said plate spring being adapted to slidably abut onto the downward facing abutment surface to produce a biasing force for rotating the pick-up base downwardly about the axis of the guide rod.

4. A skew adjustment mechanism for an optical pick-up used in an optical disc drive, the optical pick-up being provided in the disc drive freely movable in a radial direction of an optical disc along only one fixedly and unmovably provided single guide rod for playing back or recording and playing back the optical disc, and the optical pick-up including a pick-up base having a first end which is slidably connected to the guide rod and a second end opposite to the first end, wherein the skew adjustment mechanism comprises:

a tangential skew adjusting means for carrying out tangential skew adjustment by rotationally displacing the pick-up base with respect to an axis of the guide rod wherein the second end of the pick-up base includes a bottom surface, in which the tangential skew adjusting means includes a screw which vertically passes through the second end of the pick-up base such that a lower end portion of the screw protrudes from the bottom surface of the pick-up base and a sliding surface positioned a prescribed distance below the bottom surface of the second end of the pick-up base so that the lower end portion of the screw is in contact with the sliding surface, whereby the pick-up base can be displaced by adjusting the protruding length of the lower end portion of the screw.

5. A skew adjustment mechanism for an optical pick-up used in an optical disc drive, the optical pick-up comprising a pick-up base movable in a radial direction of an optical disc along only one single guide rod fixedly and unmovably provided on a chassis of the disc drive, an actuator base held on the pick-up base so as to be pivotal with respect to a virtual axis that is parallel to the guide rod, and a lens holder which is supported by the actuator base so as to be displaceable at least in tracking direction and focusing direction and which has an objective lens, wherein said skew adjustment mechanism comprising:

a first tangential skew adjustment mechanism for rotationally displacing the actuator base relative to the pick-up base about the virtual axis; and a second tangential skew adjustment mechanism for rotationally displacing the pick-up base about an axis of the guide rod.

6. A skew adjustment mechanism for an optical pickup used in an optical disc drive, the optical pick-up comprising a pick-up base movable in a radial direction of an optical disc along only one single guide rod fixedly and unmovably provided on a chassis of the disc drive, an actuator base which is held on the pick-up base so as to be displaceable relative to the pick-up base, and a lens holder which is supported by the actuator base so as to be displaceable at least in tracking direction and focusing direction and which has an objective lens, wherein said skew adjustment mechanism comprising: a first tangential skew adjustment means for carrying out tangential skew adjustment by displacing the actuator base relative to the pick-up base; and a second tangential skew adjustment means for carrying out tangential skew adjustment by rotationally displacing the pick-up base about an axis of the guide rod.

7. The skew adjustment mechanism as claimed in claim 5, wherein the pick-up base has a first end which is slidably connected to the guide rod and a second end opposite to the first end, and the second tangential skew adjustment mechanism is provided in connection with the second end of the pick-up base.

8. The skew adjustment mechanism as claimed in claim 5, wherein the first tangential skew adjustment mechanism is adjusted when the optical pick-up is assembled, and the second tangential skew adjustment mechanism is adjusted after the optical pick-up has been assembled and incorporated into the optical disc drive.

9. The skew adjustment mechanism as claimed in claim 6, wherein the pick-up base has a first end which is slidably connected to the guide rod and a second end opposite to the first end, and the second tangential skew adjustment mechanism is provided in connection with the second end of the pick-up base.

10. The skew adjustment mechanism as claimed in claim 6, wherein the first tangential skew adjustment mechanism is adjusted when the optical pick-up is assembled, and the second tangential skew adjustment mechanism is adjusted after the optical pick-up has been assembled and incorporated into the optical disc drive.

\* \* \* \* \*

UNITED STATES PATENT AND TRADEMARK OFFICE
CERTIFICATE OF CORRECTION

PATENT NO. : 6,449,238 B2
DATED : September 10, 2002
INVENTOR(S) : Furukawa et al.

It is certified that error appears in the above-identified patent and that said Letters Patent is hereby corrected as shown below:

Column 4,
Line 13, delete "is" after "invention"

Column 7,
Line 53, delete hyphen before the word "tray"
Line 56, change "dick" to -- disk --

Column 12,
Line 4, change "sifted" to -- shifted --

Column 14,
Line 46, capitalize "t" in sentence beginning "the actuator base 320..."

Column 18,
Line 65, change "crated" to -- created --

Column 21,
Line 54, change "rotatable" to -- rotatably --

Column 23,
Line 5, change "damper" to -- clamper --

Column 24,
Line 65, change "damper" to -- clamper --

Column 26,
Line 12, change "revered" to -- reversed --
Line 19, change "clains" to -- Claims --

Signed and Sealed this

Third Day of February, 2004

JON W. DUDAS
*Acting Director of the United States Patent and Trademark Office*